United States Patent [19]
Sekine et al.

[11] Patent Number: 5,936,583
[45] Date of Patent: Aug. 10, 1999

[54] PORTABLE RADIO COMMUNICATION DEVICE WITH WIDE BANDWIDTH AND IMPROVED ANTENNA RADIATION EFFICIENCY

[75] Inventors: Syuichi Sekine, Chiba-ken; Minoru Sakurai, Tokyo; Tadahiko Maeda; Yasuo Suzuki, both of Kanagawa-ken; Syuichi Obayashi, Chiba-ken, all of Japan

[73] Assignee: Kabushiki Kaisha Toshiba, Kawasaki, Japan

[21] Appl. No.: 08/822,737

[22] Filed: Mar. 24, 1997

Related U.S. Application Data

[63] Continuation of application No. 08/630,836, Apr. 10, 1996, abandoned, which is a continuation of application No. 08/128,696, Sep. 30, 1993, abandoned.

[30] Foreign Application Priority Data

Sep. 30, 1992 [JP] Japan .................................. 4-260938
Mar. 31, 1993 [JP] Japan .................................. 5-096990

[51] Int. Cl.⁶ .............................. H01Q 1/36; H01Q 1/24
[52] U.S. Cl. ........................................... 343/702; 343/895
[58] Field of Search ...................... 343/702, 806, 343/807, 749, 745, 846, 895; H01Q 1/24, 1/36

[56] References Cited

U.S. PATENT DOCUMENTS

| | | | |
|---|---|---|---|
| 3,638,226 | 1/1972 | Brooks et al. | 343/895 |
| 4,121,218 | 10/1978 | Irwin et al. | 343/702 |
| 4,160,978 | 7/1979 | DuHamel | 343/806 |
| 4,504,834 | 3/1985 | Garay et al. | 343/802 |
| 4,608,572 | 8/1986 | Blakney et al. | 343/895 |
| 4,730,195 | 3/1988 | Phillips et al. | 343/802 |
| 4,829,591 | 5/1989 | Hashimoto et al. | 343/702 |
| 4,868,576 | 9/1989 | Johnson | 343/702 |
| 4,876,552 | 10/1989 | Zakman | 343/702 |
| 4,958,382 | 9/1990 | Imanishi | 343/702 |
| 4,980,694 | 12/1990 | Hines | 343/702 |
| 5,113,196 | 5/1992 | Ponce de Leon et al. | 343/702 |
| 5,184,143 | 2/1993 | Marko | 343/702 |
| 5,220,340 | 6/1993 | Shafai | 343/895 |
| 5,231,407 | 7/1993 | McGirr et al. | 343/700 MS |
| 5,255,001 | 10/1993 | Taemura et al. | 343/702 |
| 5,262,792 | 11/1993 | Egashira | 343/895 |
| 5,337,063 | 8/1994 | Takahira | 343/895 |
| 5,353,036 | 10/1994 | Baldry | 343/702 |
| 5,365,246 | 11/1994 | Rasinger et al. | 343/702 |
| 5,394,160 | 2/1995 | Iwasaki et al. | 343/702 |

FOREIGN PATENT DOCUMENTS

| | | |
|---|---|---|
| 361388 | 10/1922 | Germany . |
| 85/02719 | 6/1985 | WIPO . |

OTHER PUBLICATIONS

Japanese Patent Abstract, vol. 10, No. 104 (E397) [2161], Apr. 19, 1986, 60–242705.

Fujimoto et al., "Small Antennas", Inverted–L Antennas, pp. 147, (1987), published by Research Studies Press LTD, Letchworth England and John Wiley & Sons Inc., New York.

Simpson, "The Theory of Top–Loaded Antennas: Integral Equations For The Currents", IEEE Transactions on Antennas And Propagation, vol. AP–19: 186–190, (1971).

Chen et al., "FDTD Analysis of Built–in S–Shaped Antenna For Portable Telephone", Proc. of the 1993 IEICE Spring Conference, B–100, (1993), pp. 2–100.

*Primary Examiner*—Michael C. Wimer
*Attorney, Agent, or Firm*—Foley & Lardner

[57] ABSTRACT

A portable radio communication device capable of eliminating the deterioration of the radiation efficiency due to the occurrence of the dual resonance on the antenna, without reducing the bandwidth. A radio communication device, comprises: a device body made of a conductor body, containing at least one of a radio transmitter and a radio receiver; and an antenna, mounted on the device body, formed by first and second strip-like conductor elements which are connected together at a feeding point connected with said at least one of the radio transmitter and the radio receiver, the first and second strip-like conductor elements having an identical electrical length with each other.

2 Claims, 36 Drawing Sheets

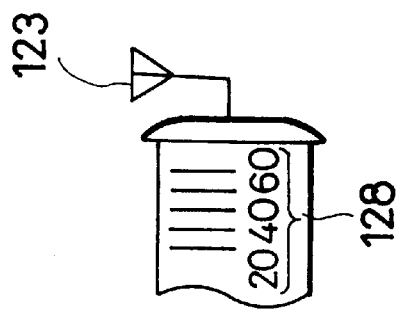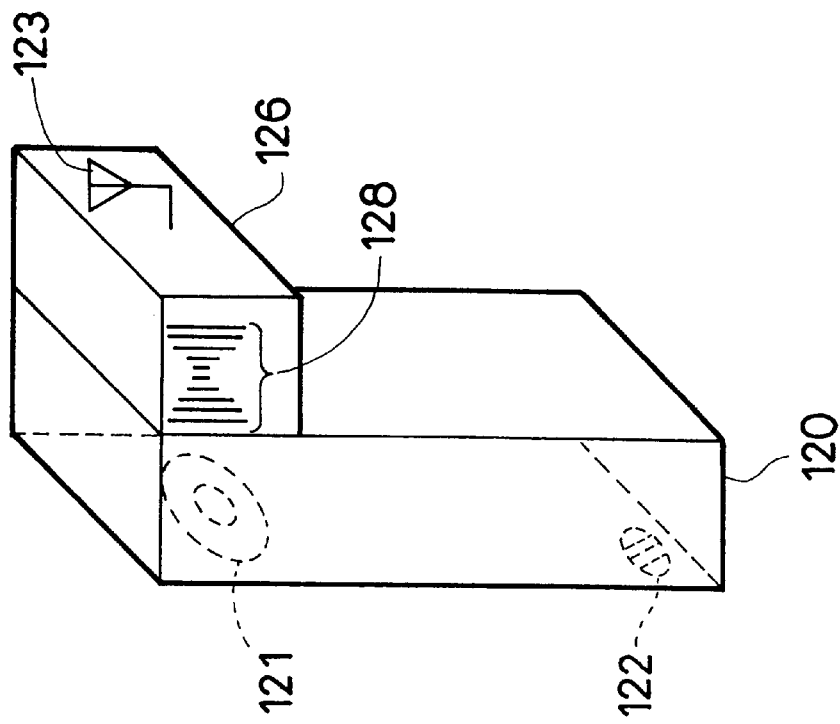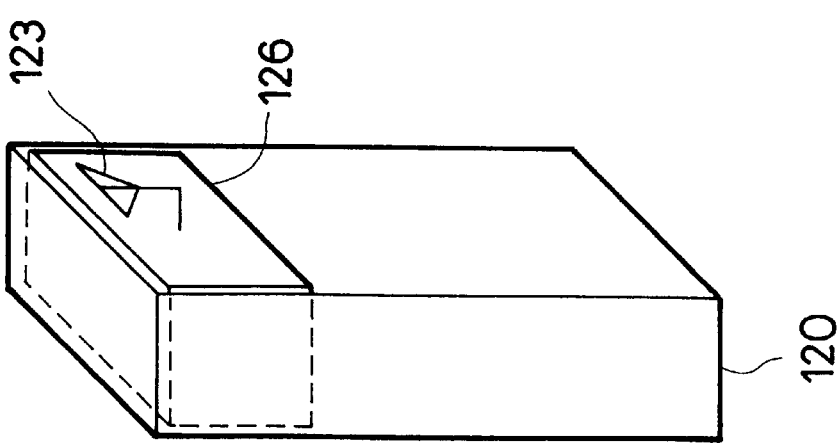

FIG. 44
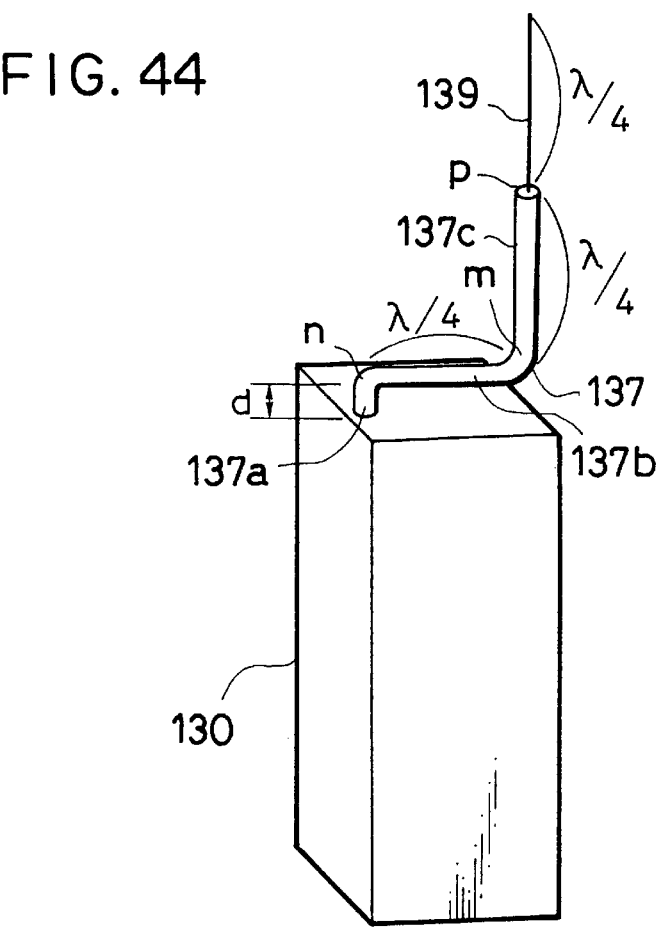
FIG. 45A    FIG. 45C
   FIG. 45B           FIG. 46
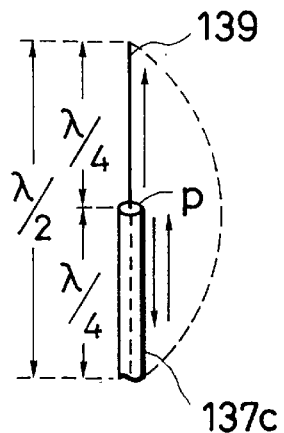
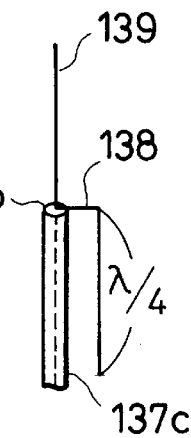
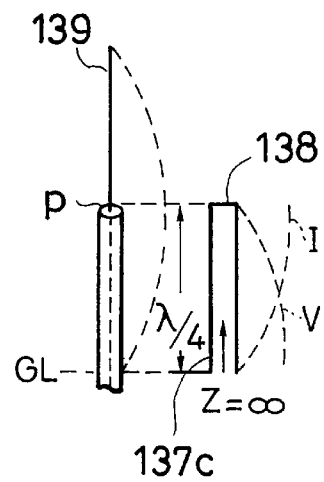
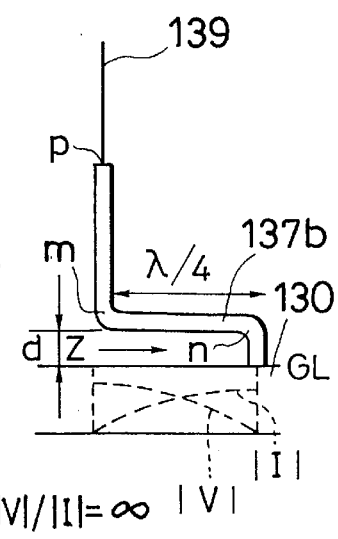

FIG. 49
FIG. 50
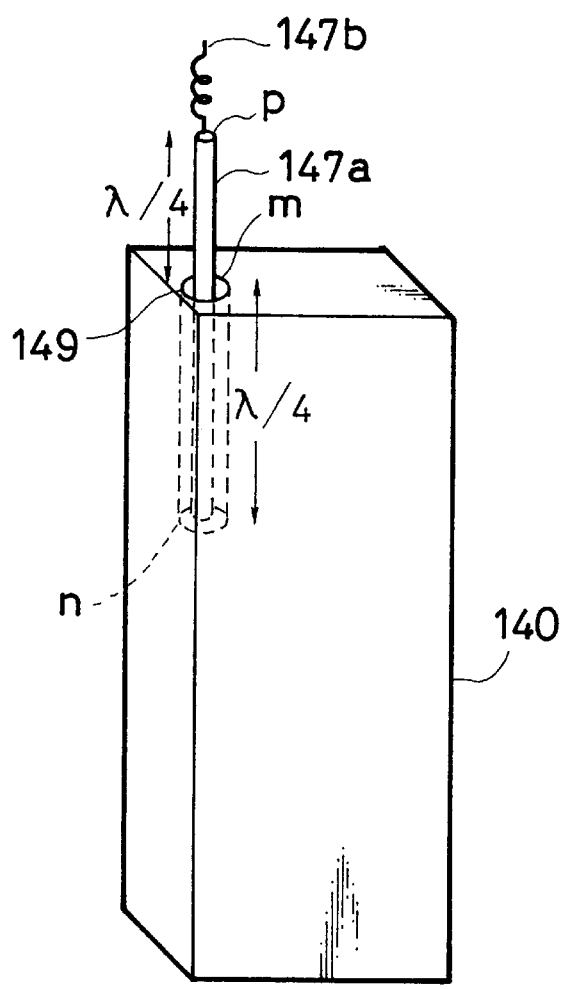
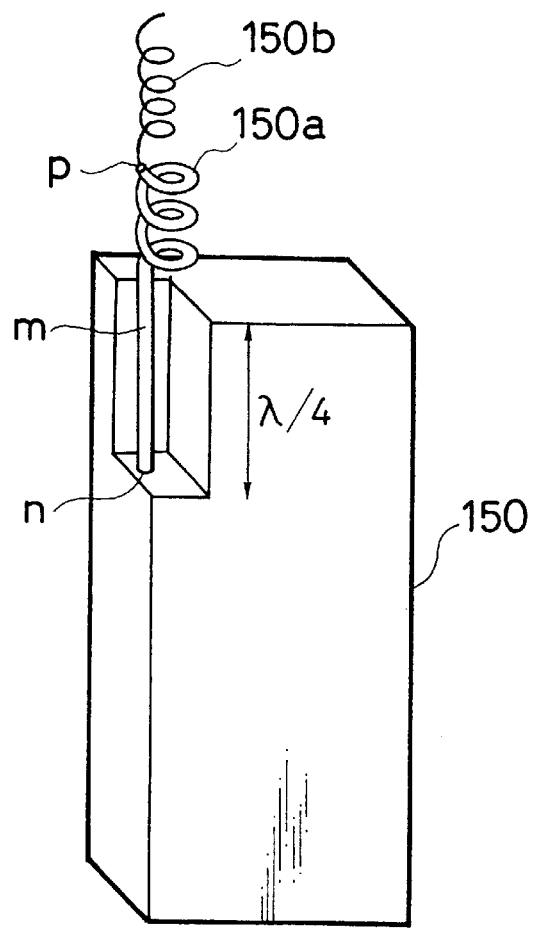

PORTABLE RADIO COMMUNICATION DEVICE WITH WIDE BANDWIDTH AND IMPROVED ANTENNA RADIATION EFFICIENCY

This application is a continuation of application Ser. No. 08/630,836 filed Apr. 10, 1996, now abandoned, which is a continuation of application Ser. No. 08/128,696, filed Sep. 30, 1993, now abandoned.

BACKGROUND OF THE INVENTION

1. Field of the Invention

The present invention relates to a portable radio communication device such as a radio transceiver.

2. Description of the Background Art

Conventionally, a whip antenna has usually been employed for a portable radio communication device such as a radio transceiver. However, as the whip antenna extends from the device body, it is often damaged during operation.

There is an alternative antenna configuration free of the drawbacks of the whip antenna, in which a line-shaped element is attached at the top of a monopole antenna such that the antenna height can be reduced. Examples of this type of antenna include the L-type antenna and the inverted F-type antenna. However, this type of antenna has been known to have a narrow bandwidth.

In order to resolve this problem, there has been a type of antenna in which the line-shaped element is replaced by a plate shaped element. Examples of this type of antenna includes the plate-shaped inverted F-type antenna. However, in this type of antenna, the bandwidth becomes progressively narrower as the size is made progressively smaller.

In view of this, there has been a proposition of an S-type antenna in which the plate-shaped element is used in the line-shaped T-type antenna. In this S-type antenna, the element attached at the top of the monopole antenna has a spiral shape that can be obtained by combining two of the inverted F-type antennas or the L-type antennas at the feeding point, and this configuration is considered to be one of the factors contributing to the wider bandwidth of the S-type antenna.

However, using an S-type antenna with a very low antenna height can be associated with the following problems.

Firstly, in this type of an antenna having a capacity load attached at its top, the current at a shortened monopole antenna portion can be considered as a component contributing to radiation in general. Consequently, when the antenna is made to have a very low antenna height, it is expected that the total current on the monopole antenna portion reduced and the radiation resistance is consequently reduced such that the Q-value of the antenna at a time of resonance becomes higher while the bandwidth characteristic of the antenna becomes narrower.

Additionally, in an antenna generally used for a radio communication device, a contribution to a radiation comes not just from the current on the antenna but also from the current on the device body. Consequently, in the above-described line-shaped antenna, the antenna element and the device body usually form a type of dipole antenna which creates radiation. This situation additionally applies to the L-type antenna and the T-type antennas.

In the T-type antenna, the element attached at the top of the monopole antenna portion can be regarded simply as a capacitive element, but it is also possible to regard this element itself as an antenna formed by combining two L-type antennas when the T-type antenna is made to have a very low antenna height, such as a height less than $\lambda/50$, where $\lambda$ is a wavelength of a radio signal used in radio communication. Consequently, when the physical length from a connection point of the monopole antenna portion and the line-shaped element to a tip end of the line-shaped element is different for two ends of the line shaped element as the connection point is displaced from a middle, this antenna has two different resonant frequencies, such that a dual resonance occurs. In this case, this antenna shows a radiation characteristic of an L-type antenna at each of these two resonant frequencies. Here, the difference between these two resonant frequencies is small when the Q-values at the two resonant frequencies are high, and becomes progressively larger as the antenna height is progressively lowered.

Conversely, the line-shaped element attached at a top of the monopole antenna functions only as a capacitive element when the antenna height is of an order of $\lambda/4$ or $\lambda/5$, but as the antenna height is progressively lowered, it begins to behave as a line with a length of $\lambda/2$. The monopole antenna portion then appears to function as a feeder for feeding currents to this line. As a result, the line-shaped element itself starts to resonate as a resonator for $\lambda/2$. In such a $\lambda/2$ resonance mode, the currents flowing on the device body are expected to cancel out each other. Consequently, the radiation from the device body is reduced and the radiation resistance of the device as a whole is reduced. However, the currents flow on the line-shaped element and the device body below the line-shaped element, Such that conductor loss is still present.

Consequently, even when impedance matching between the feeder and the antenna is seemingly established, there are cases in which the current component for the conductor loss becomes larger than the current component for the actual radiation. Here, the conductor loss becomes unignorable when the antenna height is very low and the radiation resistance is low, as well as when the resonance in the radiation mode is not occurring at this frequency.

Thus, in general, in T-type antenna with a low antenna height, the resonant frequency of the resonator for $\lambda/2$ and the resonant frequencies of the dual resonance due to the displaced connection point are very close to each other. Consequently, when the two resonant frequencies of the dual resonance due to the displaced connection point are relatively separated compared with the bandwidth of the line-shaped element, the resonance at $\lambda/2$ on the line-shaped element and the radiation from this element become predominant at the frequencies between these two resonant frequencies of the dual resonance, and the antenna efficiency is reduced for such frequencies.

According to these considerations, it can be asserted that, in the T-type antenna, the lowering of the antenna performance can be prevented by making the physical length between feeding point and tip end of the line-shaped element to be identical for two ends of the line-shaped element.

However, in practice, even when the antenna is attached to the device body with such an adjustment of the physical lengths in the antenna, the electrical length between the feeding point and the tip end of the line shaped element is not necessarily identical for two ends of the line-shaped element, because of the asymmetrical shape of the device body with respect to a point at which the antenna is attached and the asymmetrical arrangement of the other circuit components provided in the device body.

In general, an equivalent circuit for the tip end of the antenna is expressed by a capacitive element whose capacitive characteristic represents that between the tip end of the antenna and the ground plate to which the antenna is attached. However, in an antenna made in a low antenna height by attaching the line-shaped element having a plurality of tip end portions as described above, it is considered that the capacitive characteristic of each tip end portion is not uniform with respect to the entire ground plate, and produced by the strong coupling of each tip end portion with the ground plate in a vicinity of that tip end portion.

Consequently, depending on the state of the ground plate in a vicinity of each tip end portion, the capacitive characteristic of each tip end portion varies, and the difference in capacitive characteristics for different tip end portions can cause the difference in the electrical length between the feeding point and the tip end for the different tip end portions, which in turn causes the lowering of radiation efficiency due to the occurrence of the dual resonance, as described above.

In addition, in a device using this type of antenna, the device body also functions as a ground plate and the currents on the device body also contributes to the radiation. In this regard, in order to reduce the influence on the antenna characteristic due to the hand of the user holding the device body, it is necessary to mount the antenna on an upper portion of the device body, so that the antenna and the device body are inevitably arranged asymmetrically, and this asymmetrical arrangement of the antenna and the device body causes the deterioration of radiation efficiency for the reason already described above, even when the line-shaped element itself is formed symmetrically with respect to the feeding point.

In view of the convenience for carrying, it is preferable for the portable radio communication device to be of a small size. However, when the radio communication device is made in a small size, the hand and the head of the user holding the device body are going to come into an even closer proximity to the antenna such that the radiation field of the antenna can be affected.

As a scheme to reduce this interaction between the antenna and the user's body, it is possible to provide a measure for not directing the radiation toward the user's body. To this end, it is necessary for the antenna to have a definite radiation directivity. As an example of such an antenna with a simple configuration, there is a configuration in which passive elements are arranged in an array around the antenna such that any desired radiation directivity can be obtained by appropriately setting the arrangement of the antenna and the passive elements.

However, since the human head also possesses some conductive property for radio frequency electromagnetic waves, when the antenna is mounted on the top end of the device body, the electrical projection image of the antenna is formed on the surface of the user's head. The radiation field obtained by appropriately adjusting the antenna element as described above is then severely affected by this projection image on the user's head, and there are cases in which the desired radiation directivity cannot be realized.

Even when the radiation field is not directed toward the user's body, there is a problem of a direct interaction between the hand and the head of the user with currents on the device body contacting the hand and the head of the user. In particular, in a case where the antenna is a $\lambda/4$ monopole antenna or a built-in antenna such as a plate shaped inverted F-type antenna, the radio frequency currents flowing on the device body are relatively large and make a relatively large contribution to the radiation field of the entire radio communication device. The influence due to the human body in this case is going to be unignorable.

As a scheme for resolving this problem, it is possible to consider separating the device body part contacted by the user's body from the device body part connected with the antenna at radio frequencies. However, for a small sized radio communication device, these separated parts are inevitably located fairly close to each other, so that it is rather difficult to disconnect these separated parts completely, unless the size of the radio communication device itself is increased considerably to incorporate the mechanism necessary to achieve such a complete disconnection between these separated parts.

In this regard, as an antenna suitable for a portable radio communication device, there has been a proposition for a sleeve monopole antenna with a balun as shown in FIG. 1, which shows a radio communication device comprising a device body 210 equipped with a speaker 211, a display 212, a keyboard 213, and a microphone 215, and an antenna 216 equipped with a cylindrical conductor body 217*a* with a length of about $\lambda/4$ called a balun for providing a choking effect with respect to the radio frequency currents. Because of this balun 217*a*, this sleeve monopole antenna of FIG. 1 has a characteristic of not allowing the radio frequency currents to flow on the device body 210 compared with an antenna without a balun, so that the reduction of the influence due to the user's body can be expected. However, in order to actually construct this antenna of FIG. 1, it is necessary to cover the coaxial feeder with a cylindrical dielectric body 217*b*, and then providing the balun 217*a* over this dielectric body 217*b*, so that the structure of the antenna 216 becomes quite complicated. As a result, it becomes difficult to provide any resiliency to this antenna 216 itself, and therefore this antenna 216 can be easily damaged while carrying, and it is difficult to make this antenna in a small size.

On the other hand, in order to simplify the configuration of such a sleeve monopole antenna, if the balun 217*a* is removed, the resulting radiation field appears as indicated in FIG. 2, which shows the radiation field for an antenna shown in FIG. 3 comprising a feeder 219 of $\lambda/4$ length connected with an antenna element 218 of $\lambda/4$ length mounted on the device body 220 made of a conductive body. In terms of their lengths, the feeder 219 and the antenna element 218 of this antenna of FIG. 3 appear to constitute a dipole antenna having a radiation field in a shape indicated in FIG. 4, but the actual radiation field of this antenna of FIG. 3 indicated in FIG. 2 largely differs from this ideal radiation field of the dipole antenna indicated in FIG. 4. This difference is caused by the currents flowing over the outer conductive portion of the feeder 219 from a feeding point located at a connection point between the antenna element 218 and the feeder 219, which are not stopped at the connection point between the feeder 219 and the device body 220. These are further flown into the device body 220, such that the radiation from the currents flowing over the device body 220 affects the radiation field of the antenna as a whole. The radiation field actually shown in FIG. 2 is obtained for the device body 22 with a body length of about $\lambda$, so that the the radiation field indicated in FIG. 2 rather resembles the ideal radiation field for the dipole antenna for $(2/3)\lambda$ as indicated in FIG. 5.

Thus, by removing the balun, the radiation field of the radio communication device is largely changed from that of the ideal $\lambda/2$ dipole antenna indicated in FIG. 4 to that if FIG. 2, while the influence due to the interaction between antenna and the user's hand and head and the device body contacted by the user's hand and head cannot be prevented because of the radio frequency currents flowing into the device body.

SUMMARY OF THE INVENTION

It is therefore an object of the present invention to provide a portable radio communication device capable of eliminating the deterioration of radiation efficiency due to the occurrence of dual resonance on the antenna, without reducing the bandwidth.

It is another object of the present invention to provide a portable radio communication device capable of reducing the interaction of the antenna with the user's body, such that a stable radio communication can be realized, without reducing the bandwidth.

According to one aspect of the present invention there is provided a radio communication device, comprising a device body made of a conductor body, containing a radio transmitter and, radio receiver; and an antenna, mounted on the device body, formed by first and second strip-like conductor elements which are connected together at a feeding point connected with the radio transmitter and radio receiver, where the first and second strip-like conductor elements have an identical electrical length.

According to another aspect of the present invention there is provided a method of constructing a radio communication device, comprising the steps of forming an antenna from first and second strip-like conductor elements having an identical electrical length with each other, and mounting the antenna on a device body made of a conductor body containing a radio transmitter and a radio receiver, and connecting the first and second strip-like conductor elements with the radio transmitter and the radio receiver through a feeding point at which the first and second strip-like conductor elements are connected together.

Other features and advantages of the present invention will become apparent from the following description taken in conjunction with the accompanying drawings.

BRIEF DESCRIPTION OF THE DRAWINGS

FIGS. 39A and 39B are perspective views of another configuration for improving an antenna performance in a portable radio communication device according to the present invention.

FIG. 39C is an illustration of a scale provided on a drawer portion in the configuration of FIGS. 39A and 39B.

FIGS. 42A and 42B are perspective views of another configuration for improving an antenna performance in a portable radio communication device according to the present invention.

FIG. 44 is a perspective view of another configuration for improving an antenna performance in a portable radio communication device according to the present invention.

FIGS. 45A, 45B, and 45C are illustrations of a possible antenna configuration for realizing a choking effect for radio frequency currents.

FIG. 46 is an illustration of an antenna configuration for realizing a choking effect for radio frequency currents in the configuration of FIG. 44.

FIG. 49 is a perspective view of another configuration for improving an antenna performance in a portable radio communication device according to the present invention.

FIG. 50 is a perspective view of another configuration for improving an antenna performance in a portable radio communication device according to the present invention.

DETAILED DESCRIPTION OF THE PREFERRED EMBODIMENTS

Figure 6:
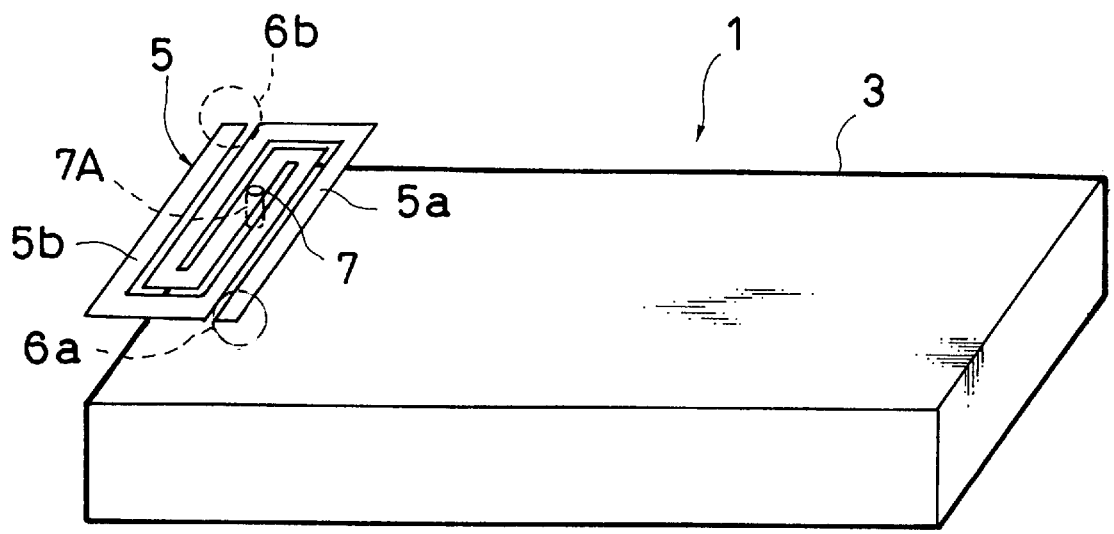
FIG. 6 is a perspective view of a first embodiment of a portable radio communication device according to the present invention.
Figure 7:
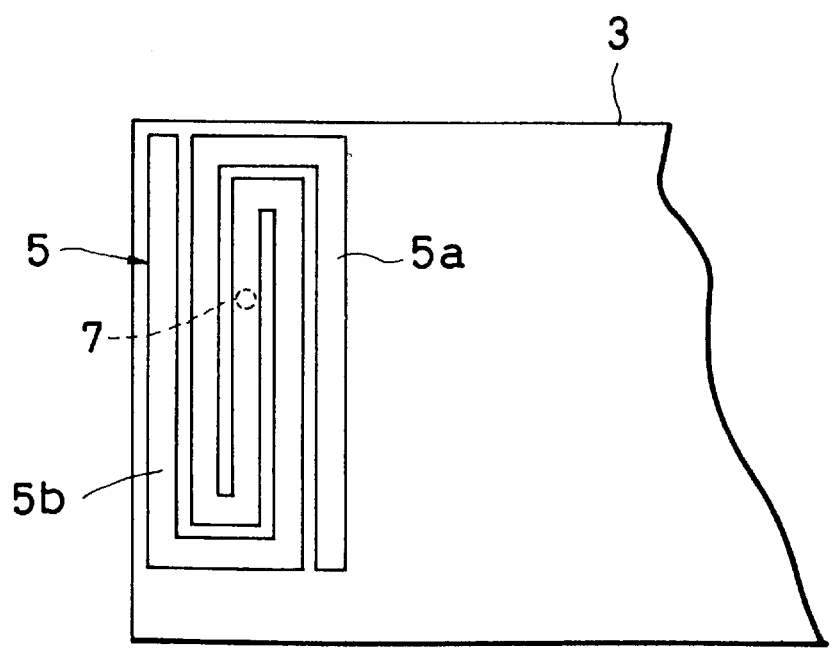
FIG. 7 is a top plan view of an antenna portion of the portable radio communication device of FIG. 6.

Referring now to FIGS. 6 and 7, a first embodiment of a portable radio communication device according to the present invention will be described.

As shown in FIGS. 6 and 7, in this first embodiment, the device 1 generally comprises: a box shaped device body 3 made of a conductor body, containing at least one of a radio transmitter and a radio receiver (not shown); and a spiral shaped antenna 5, mounted on the device body 3 in parallel to a top surface of the device body 3 near an edge of the device body 3, which is formed by approximately G-shaped first and second strip-like conductor elements 5a and 5b which are integrally connected together at a feeding point 7 at which a feeder 7A connected with said at least one of a radio transmitter and a radio receiver contained in the device body 3 is attached.

Here, this antenna 5 has a total circumferential length greater than or equal to one wavelength $\lambda$ of a radio signal to be used for a radio communication, and a height from the device body 3 less than or equal to $\lambda/8$, so that the bandwidth of this spiral shaped antenna 5 can be widened compared with the conventional L-type antenna having the electrical length of about $\lambda/4$. Also, an overall spiral shape of this antenna 5 as a whole is substantially symmetrical with respect to a central point between a free end 6a of the first strip-like conductor element 5a and a free end 6b of the second strip-like conductor element 5b.

In addition, in this first embodiment, the feeding point 7 is located at a position displaced from a central point between a free end 6a of the first strip-like conductor element 5a and a free end 6b of the second strip-like conductor element 5b, such that the electrical lengths of the first and second strip-like conductor elements 5a and 5b are equal to each other. Consequently, in this configuration of FIGS. 6 and 7, the occurrence of the dual resonance on this antenna 5 can be prevented, and therefore the deterioration of the radiation efficiency due to the occurrence of the dual resonance can be eliminated.

Figure 8:
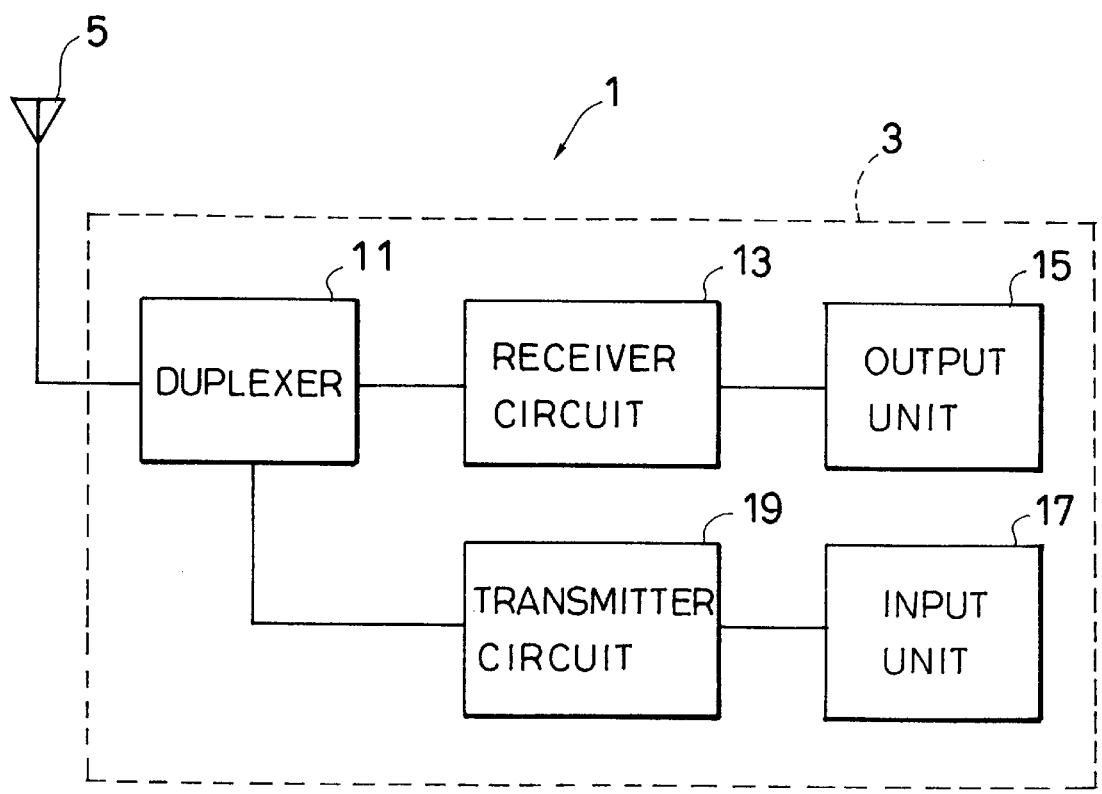
FIG. 8 is a schematic block diagram of the portable radio communication device of FIG. 6.

Also, as shown in FIG. 8, the device body 3 of this device 1 of FIGS. 6 and 7 can contain a receiver circuit 13 and a transmitter circuit 19 which are connected with the antenna 5 through a duplexer 11, an output unit 15 such as a speaker and a display connected with the receiver circuit 13, and an input circuit 17 such as a microphone and a keyboard connected with the transmitter circuit 19. Here, it is to be noted that, in this configuration of FIG. 8, the antenna 5 is utilized for both of the radio transmission and the radio reception, but it is also possible to provide separate dedicated antennas for each of the radio transmission and the radio reception. It is also possible to omit the receiver circuit 13 and the output unit 15 from this configuration of FIG. 8 to make this device 1 to be a dedicated radio transmitter device, or to omit the transmitter circuit 19 and the input unit 17 from this configuration of FIG. 8 to make this device 1 to be a dedicated radio receiver device.

The effect of the improvement of radiation efficiency in this first embodiment is demonstrated as follows.

Figure 9A:
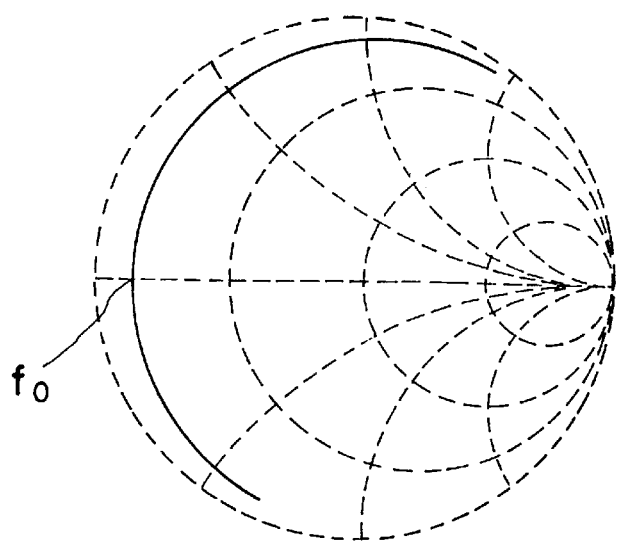
FIG. 9A is the Smith chart for the input impedance of the radio communication device of FIG. 6.
Figure 9B:
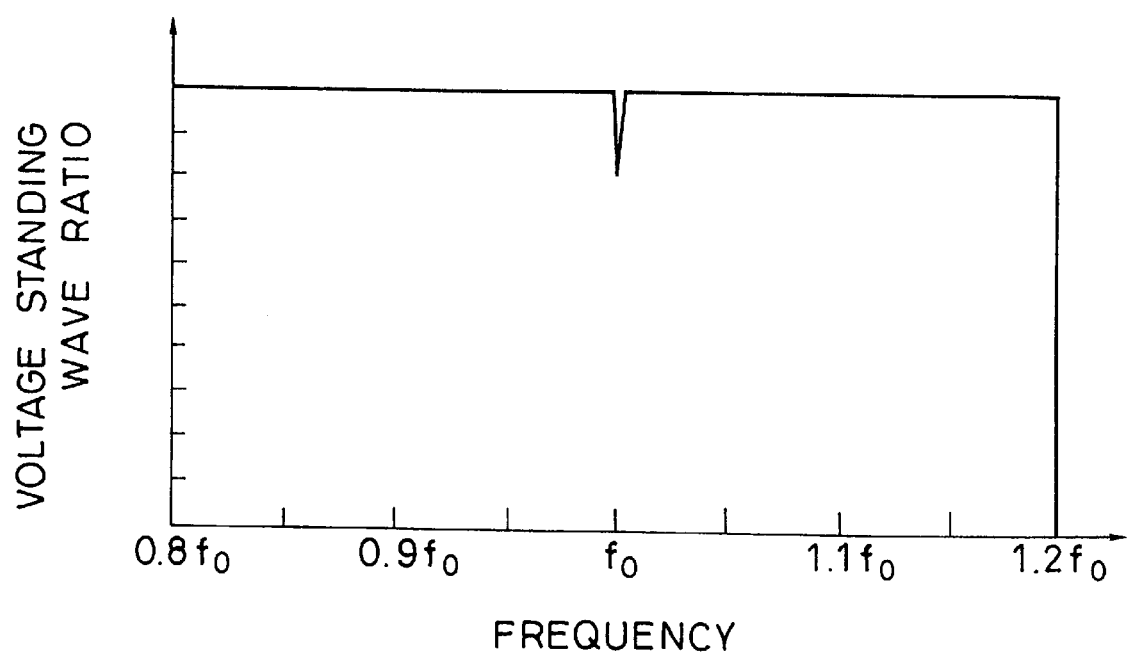
FIG. 9B is a graph of a voltage standing wave ratio as a function of frequency for the radio communication device of FIG. 6.

The Smith chart for the input impedance and a graph of the voltage standing wave ratio as a function of frequently obtained by using the device 1 of FIGS. 6 and 7 are shown in FIGS. 9A and 9B.

Figure 10:
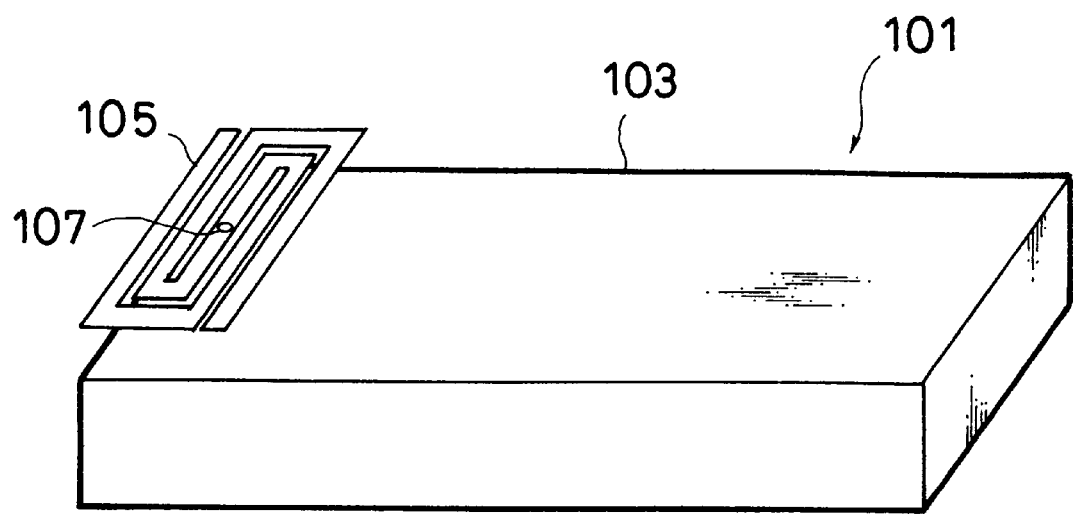
FIG. 10 is a perspective view of a comparative example of a portable radio communication device.
Figure 11:
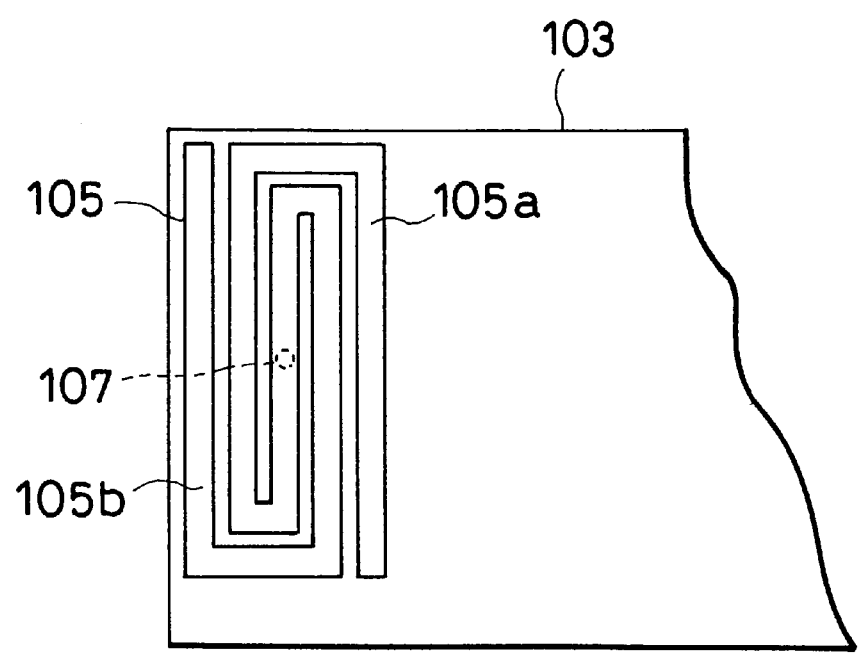
FIG. 11 is a top plan view of an antenna portion of the portable radio communication device of FIG. 10.

As a comparison, a similar Smith chart for the input impedance and a graph of the voltage standing wave ratio as a function of frequency were also obtained by using a device having a configuration as shown in FIGS. 10 and 11. This device 101 of FIGS. 10 and 11 has a configuration similar to that of FIGS. 6 and 7 described above which generally comprises: a box shaped device body 103 made of a conductor body, containing at least one of a radio transmitter and a radio receiver (not shown); and a spiral shaped antenna 105, mounted on the device body 103 in parallel to a top surface of the device body 103 near an edge of the device body 103. This device 101 of FIGS. 10 and 11 differs from the configuration of FIGS. 6 and 7 in that a feeding point 107 is located at a central point between two free ends of the antenna 105, with respect to which an overall spiral shape of this antenna 105 is symmetrical. Thus, in this configuration of FIGS. 10 and 11, the electrical lengths of the first and second strip-like conductor elements 105a and 105b are not equal to each other, and therefore the dual resonance occurs on this antenna 105.

Figure 12A:
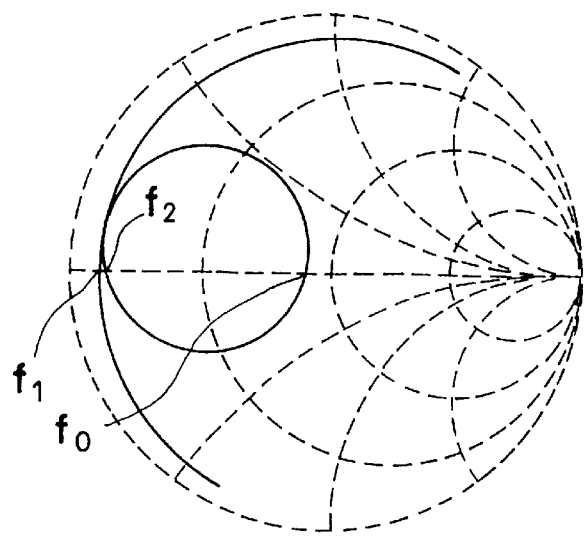
FIG. 12A is the Smith chart for the input impedance of the radio communication device of FIG. 10.
Figure 12B:
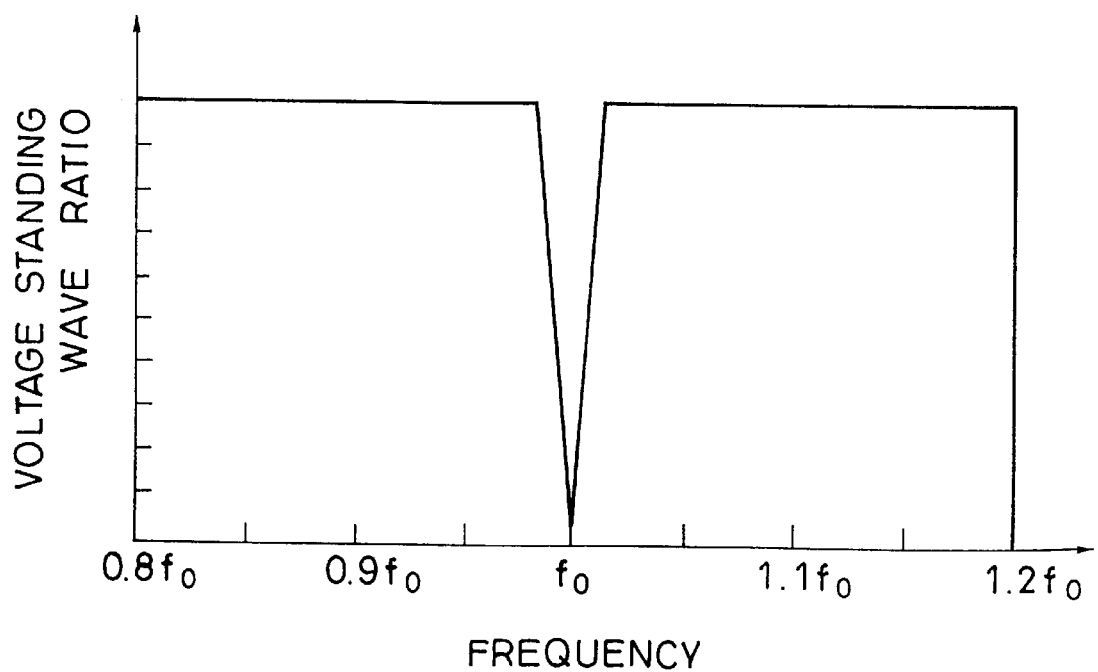
FIG. 12B is a graph of a voltage standing wave ratio as a function of frequency for the radio communication device of FIG. 10.

The Smith chart for the input impedance and a graph of the voltage stationary wave ratio as a function of frequency obtained by using this device 101 of FIGS. 10 and 11 are shown in FIGS. 12A and 12B.

Figure 13:
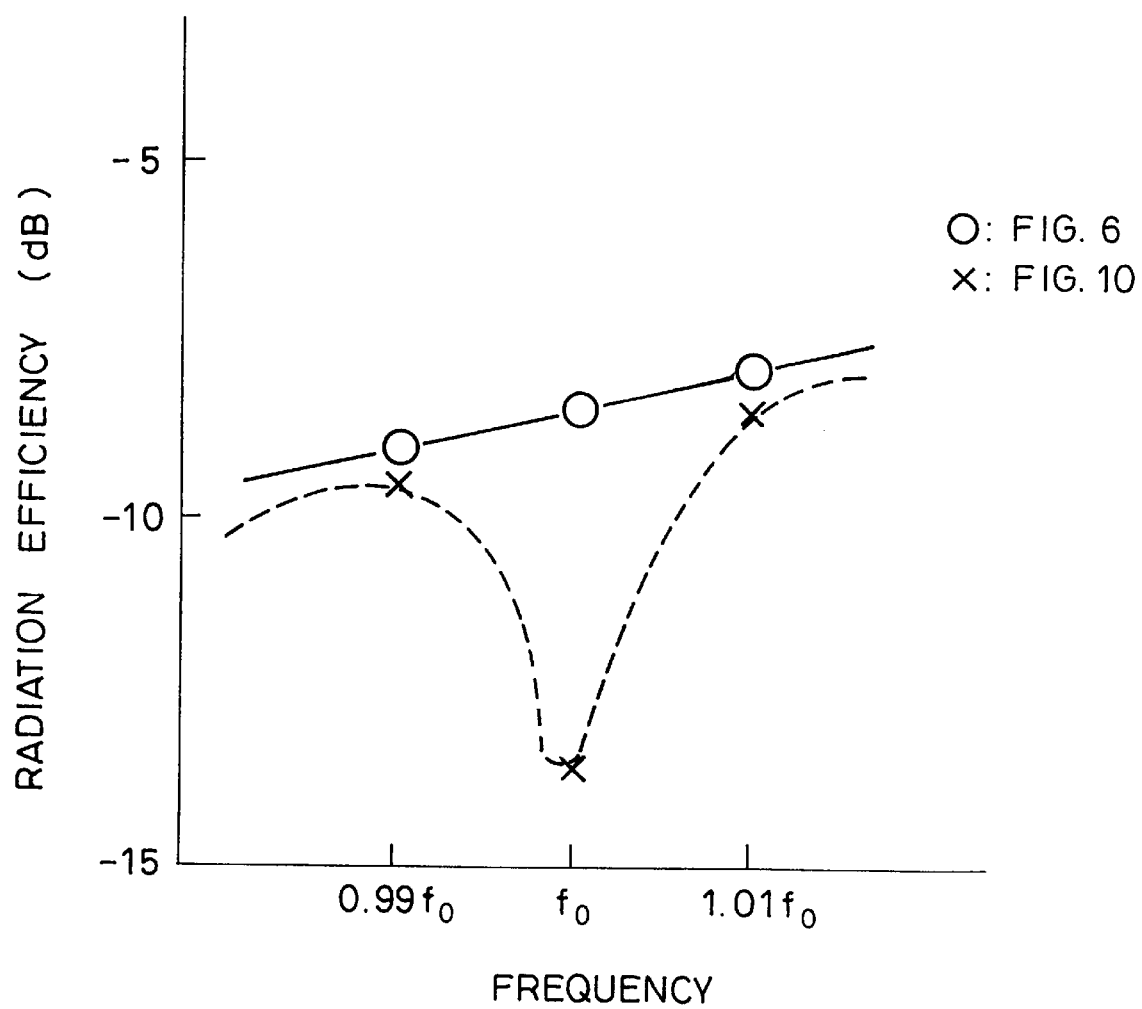
FIG. 13 is a graph of the radiation efficiency as a function of frequency for the portable radio communication devices of FIG. 6 and FIG. 10.

In addition, a graph of the radiation efficiency as a function of frequency for both of the device 1 of FIGS. 6 and 7 and the device 101 of FIGS. 10 and 11 is shown in FIG. 13.

By comparing the Smith charts of FIGS. 9A and 12A, it can be seen that a loop is appearing in an impedance locus for the frequency $f_0$ in FIG. 12A, indicating an occurrence of the dual resonance at frequencies $f_1$ and $f_2$ on the device 101 of FIGS. 10 and 11, whereas an impedance trajectory for the frequency $f_0$ in FIG. 9A has no loop, indicating an absence of the dual resonance on the device 1 of FIGS. 6 and 7.

On the other hand, by comparing the graphs of FIGS. 9B and 12B, it appears that the seemingly better impedance matching between the feeder and the antenna was established for the frequency $f_0$ on the device 101 of FIGS. 10 and 11 rather than on the device 1 of FIGS. 6 and 7. However, it can be seen from FIG. 13 that the radiation efficiency in a vicinity of this frequency $f_0$ for the device 101 of FIGS. 10 and 11 was lower than that for the device 1 of FIGS. 6 and 7 by as much as nearly 6 dB.

Thus, according to this first embodiment, it becomes possible to provide a portable radio communication device capable of eliminating the deterioration of the radiation efficiency due to the occurrence of the dual resonance on the antenna, without reducing the bandwidth.

Figure 14:
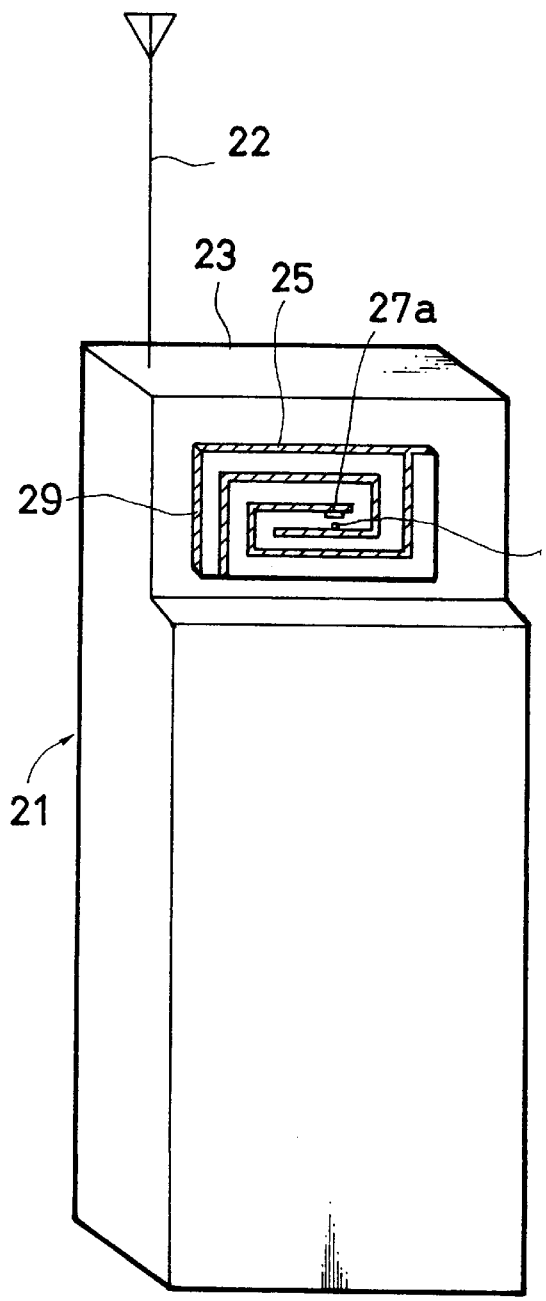
FIG. 14 is a perspective view of a second embodiment of a portable radio communication device according to the present invention.

Referring now to FIG. 14, a second embodiment of a portable radio communication device according to the present invention will be described.

As shown in FIG. 14, in this second embodiment, the device 21 generally comprises: a box shaped device body 23 made of a conductor body, containing at least one of a radio transmitter and a radio receiver (not shown); a spiral shaped antenna 25, mounted on the device body 23 in parallel to a surface of a cut out portion provided near an edge of the device body 23; and a whip antenna 22 mounted on a top surface of the device body 23.

In this configuration of FIG. 14, the whip antenna 22 and the spiral shaped antenna 25 are provided to realize the diversity system with both antennas. Here, the feeding for the antenna can be automatically switched from the spiral shaped antenna 25 to the whip antenna 22 whenever the whip antenna 22 is whipped out, such that the smaller sized spiral shaped antenna 25 can be used in a strong electric field region while the whip antenna 22 can be used in a weak electric field region to achieve a stable radio communication.

Figure 15A:
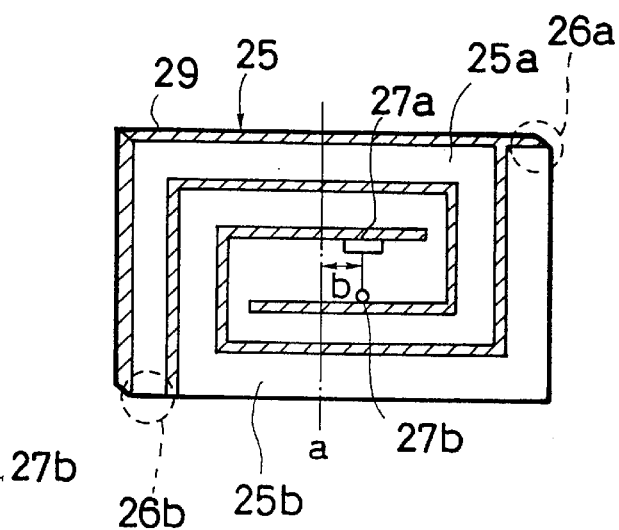
FIG. 15A is a top plan view of an antenna element in the portable radio communication device of FIG. 14.
Figure 15B:
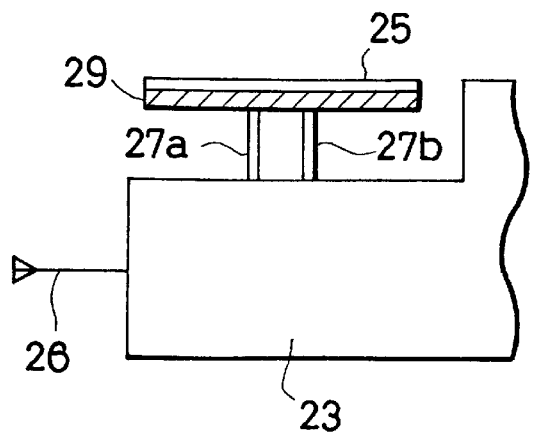
FIG. 15B is a side view of an antenna element in the portable radio communication device of FIG. 14.

As shown in FIGS. 15A and 15B, in this second embodiment, the spiral shaped antenna 25 is formed from a strip-like conductor element obtained by etching grooves on a copper thin film formed over a dielectric substrate 29 such as a polytetrafluoroethylene substrate of about 0.8 mm thickness, to which a short-circuit line 27a connected between the strip-like conductor element and the device body 23, and a feeder 27b connected between the strip-like conductor element and said at least one of a radio transmitter and a radio receiver contained in the device body 23 are attached, where the strip-like conductor element includes spiral shaped first and second strip-like conductor elements 25a and 25b which are integrally connected together at a line joining the short-circuit line 27a and the feeder 27b.

Here, this spiral shaped antenna 25 has a total circumferential length of about one wavelength $\lambda$ of a radio signal to be used for a radio communication, and a total electrical length of about $\lambda/2$, so that the bandwidth of this spiral shaped antenna 25 can be widened compared with the conventional L-type antenna having the electrical length of about $\lambda/4$. Also, an overall spiral shape of this spiral shaped antenna 25 as a whole is substantially symmetrical with respect to a central point of the strip-like conductor element.

In addition, in this second embodiment, the short-circuit line 27a and the feeder 27b are located along a line displaced from a central line "a" of the strip-like conductor element by a distance "b", such that the physical lengths from the feeder 27b to a free end 26a of the first strip-like conductor element 25a and a free end 26b of the second strip-like conductor element 25b are different but the electrical lengths of the first and second strip-like conductor elements 25a and 25b are equal to each other.

Consequently, in this configuration of FIG. 14, the occurrence of the dual resonance on this spiral shaped antenna 25 can be prevented, and therefore the deterioration of the radiation efficiency due to the occurrence of the dual resonance can be eliminated. Moreover, in this configuration of FIG. 14, the short-circuit line 27a makes it easier to establish the impedance matching between the antenna 25 and the feeder 27.

Here, the distance "b" by which the short-circuit line 27a and the feeder 27b are to be displaced from the central line "a" depends on a relationship between the wavelength of the radio signal to be used for the radio communication and the size of the antenna 25. For example, for the frequency of 800 MHz, and the enveloping size of the antenna 25 of 20 mm×35 mm, the distance "b" should preferably be in a range of $\lambda/50$ to $\lambda/100$ for the significant improvement of the radiation efficiency.

It is to be noted that, by increasing the electrical length of the spiral shaped antenna 25, the bandwidth can be widened further, and this increase of the electrical length of the spiral shaped antenna 25 can be achieved by forming one of the first and second strip-like conductor elements 25a and 25b to be wider than the other and displacing the short-circuit line 27a and the feeder 27b toward that wider one of the first and second strip-like conductor elements 25a and 25b.

It is also to be noted that, by increasing the electrical length of the spiral shaped antenna 25 by inserting the dielectric body between the spiral shaped antenna 25 and the device body 23, it is also possible to obtain the similar effect of the widening of the bandwidth with even shorter physical length of the first and second strip-like conductor elements 25a and 25b.

Figure 16A:
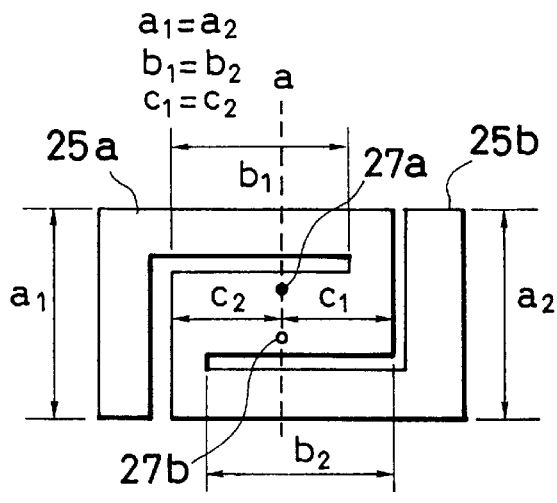
FIG. 16A is an illustration of an antenna element without an adjustment of electrical lengths according to the present invention.

Now, there are various manners of adjusting the electrical lengths of the first and second strip-like conductor elements 25a and 25b to be equal to each other that can be utilized in this second embodiment, and these various manners can be summarized as follows. Here, for the sake of simplicity, the explanation will be given for a case of adjusting the electrical lengths in a simplified shape of the spiral shaped antenna 25 as shown in FIG. 16A in which the short-circuit line 27a and the feeder 27b are located along a central line "a" of the strip-like conductor element and the first and second strip-like conductor elements 25a and 25b are completely symmetrical with respect to a central point on this central line "a".

On one hand, the adjustment of the electrical lengths can be achieved by making the physical shapes of the first and second strip-like conductor elements 25a and 25b to be different.

Figure 16C:
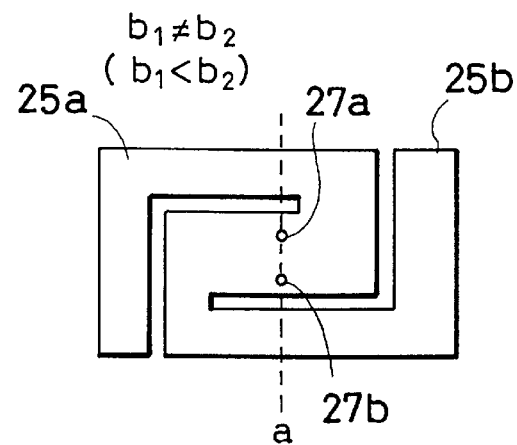
FIGS. 16B, 16C, and 16D are illustrations of antenna elements for showing three different manners of the adjustment of electrical lengths according to the present invention.
Figure 16B:
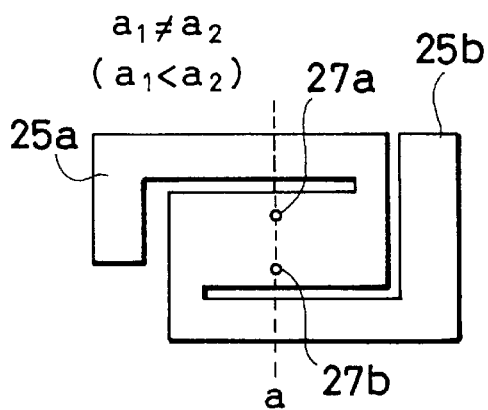

Namely, as shown in FIG. 16B, a longitudinal strip length al of the first strip-like conductor element 25a can be made shorter than a longitudinal strip length a2 of the second strip-like conductor element 25b to adjust the electrical lengths.

Also, as shown in FIG. 16C, a transverse groove length b1 of the first strip-like conductor element 25a can be made shorter than a transverse groove length b2 of the second strip-like conductor element 25b to adjust the electrical lengths.

Figure 16D:
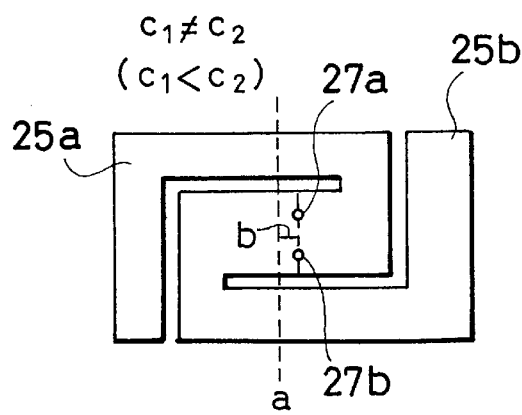

Also, as shown in FIG. 16D, a transverse central strip length cl of the first strip-like conductor element 25a can be made shorter than a transverse central strip length c2 of the second strip-like conductor element 25b to adjust the electrical lengths, such that the short-circuit line 27a and the feeder 27b are effectively displaced by the distance "b" from the central line "a", just as in the case shown in FIG. 15A described above.

On the other hand, the adjustment of the electrical lengths can be achieved by making the capacitances of the first and second strip-like conductor elements 25a and 25b to be different.

Figure 17A:
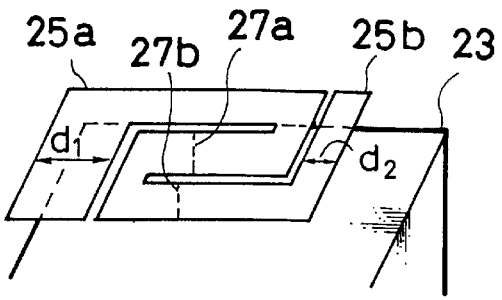
FIGS. 17A, 17B, 17C, 17D, and 17E are illustrations of antenna elements for showing various additional manners of adjustment of electrical lengths according to the present invention.

Namely, as shown in FIG. 17A, a longitudinal strip width d1 of the first strip-like conductor element 25a can be made wider than a longitudinal strip width d2 of the second strip-like conductor element 25b such that the capacitance of the first strip-like conductor element 25a becomes larger than the capacitance of the second strip-like conductor element 25b, to adjust the electrical lengths.

Figure 17B:
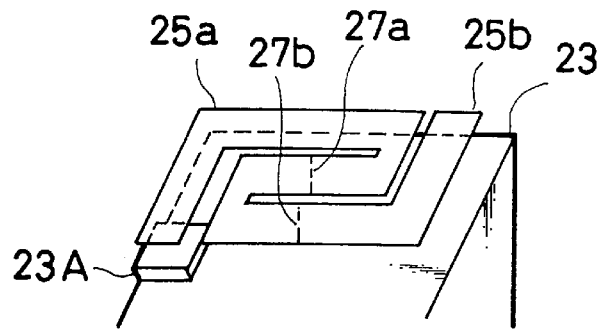

Also, as shown in FIG. 17B, the device body 23 can incorporate a conductive convex portion 23A located below a free end of the first strip-like conductor element 25a such that the capacitance of the first strip-like conductor element 25a becomes larger than the capacitance of the second strip-like conductor element 25b, to adjust the electrical lengths. Here, the conductive convex portion 23A may contain some circuit component therein if desired.

Figure 17C:
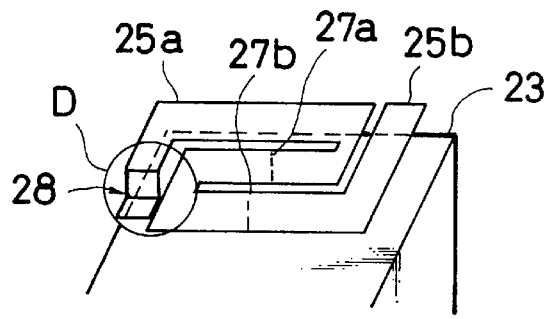
Figure 17D:
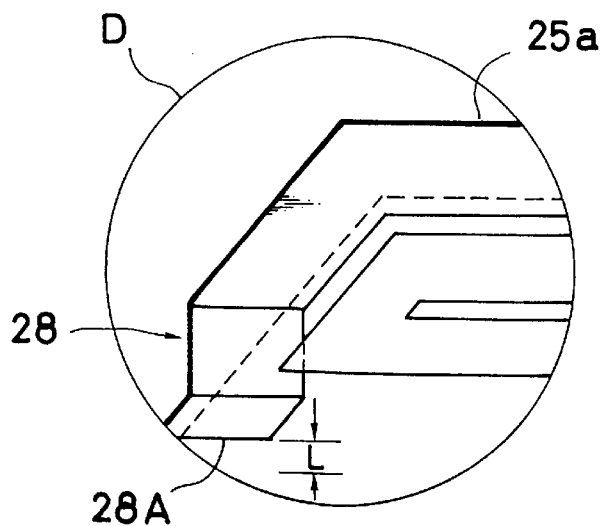

Also, as shown in FIG. 17C, a free end of the first strip-like conductor element 25a can incorporate a bent end portion 28, where a lower end 28A of the bent end portion 28 is separated from a surface of the device body 23 by a distance L as shown in FIG. 17D, such that the capacitance of the first strip-like conductor element 25a becomes larger than the capacitance of the second strip-like conductor element 25b, to adjust the electrical lengths.

Figure 17E:
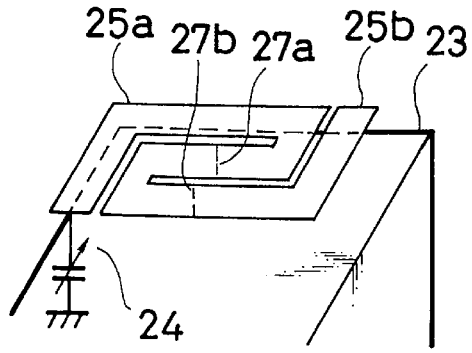

Also, as shown in FIG. 17E, a variable capacitor 24 can be provided between the device body 23 and a free end of the first strip-like conductor element 25a, such that the capacitance of the first strip-like conductor element 25a becomes larger than the capacitance of the second strip-like conductor element 25b, to adjust the electrical lengths. In this case, the fine adjustment of the electrical lengths can be made by adjusting the variable capacitor 24.

Thus, according to this second embodiment, it also becomes possible to provide a portable radio communication device capable of eliminating the deterioration of the radiation efficiency due to the occurrence of the dual resonance on the antenna, without reducing the bandwidth.

Figure 18:
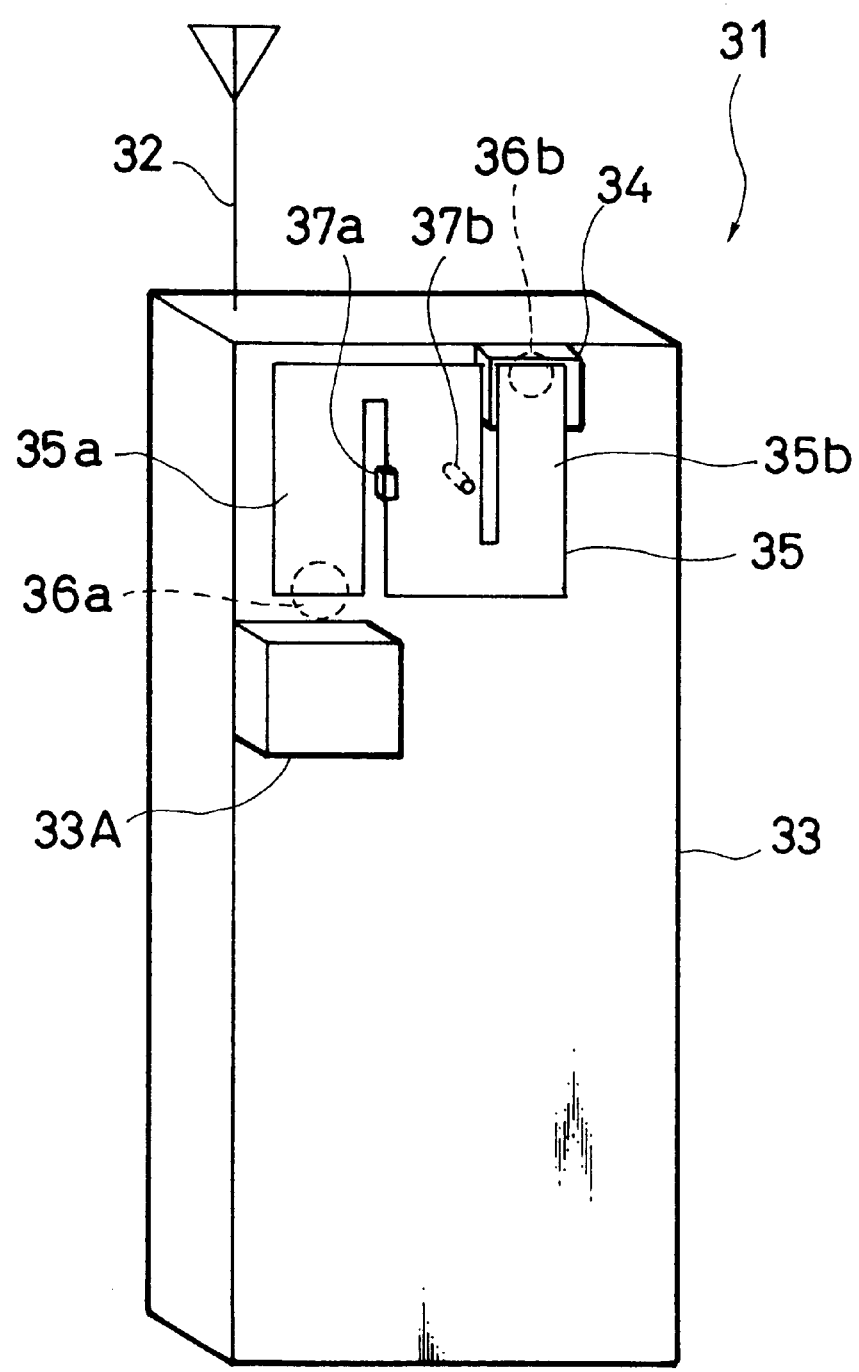
FIG. 18 is a perspective view of a third embodiment of a portable radio communication device according to the present invention.

Referring now to FIG. 18, a third embodiment of a portable radio communication device according to the present invention will be described.

As shown in FIG. 18, in this third embodiment, the device 31 generally comprises: a box shaped device body 33 made of a conductor body, containing at least one of a radio transmitter and a radio receiver (not shown); an inverted S-shaped antenna 35, mounted on the device body 33 in parallel to a side surface of the device body 33 near an edge of the device body 33; and a whip antenna 32 mounted on a top surface of the device body 33. Here, the whip antenna 32 and the inverted S-shaped antenna 35 are used similarly to the whip antenna 22 and the spiral shaped antenna 25 in the second embodiment of FIG. 14 described above.

Also, in this third embodiment, the inverted S-shaped antenna 35 is formed from approximately J-shaped first and second strip-like conductor elements 35a and 35b which are integrally connected together at a line joining a short-circuit line 37a and a feeder 37b, where the short-circuit line 37a is connected between the inverted S-shaped antenna 35 and the device body 23, and the feeder 37b is connected between the inverted S-shaped antenna 35 and said at least one of a radio transmitter and a radio receiver contained in the device body 23.

In addition, the device body 33 incorporates a conductive convex portion 33A in a vicinity of a free end 36a of the first strip-like conductor element 35a, such that the free end 36a is capacitively coupled with this conductive convex portion 33A to increase the capacitance of the first strip-like conductor element 35a, while there is a dielectric body 34 inserted between the device body 33 and a free end 35b of the second strip-like conductor element 35b, such that the capacitance of the second strip-like conductor element 35b, is increased.

Consequently, the electrical lengths of the first and second strip-like conductor elements 35a and 35b are increased in this third embodiment, without increasing the physical enveloping length of this inverted S-shaped antenna 35, such that the widening of the bandwidth can be achieved without increasing the size, volume and weight of the device 31 as a whole.

Furthermore, in this third embodiment, the short-circuit line 37a and the feeder 37b are located along a central line of the inverted S-shaped antenna 35, while an overall spiral shape of this inverted S-shaped antenna 35 as a whole is substantially symmetrical with respect to a central point on this central line, but the electrical lengths of the first and second strip-like conductor elements 35a and 35b are increased by means of the conductive convex portion 33A and the dielectric body 34 as described above such that the electrical lengths of the first and second strip-like conductor elements 35a and 35b becomes equal to each other.

Consequently, in this configuration of FIG. 18, the occurrence of the dual resonance on this inverted S-shaped antenna 35 can be prevented, and therefore the deterioration of the radiation efficiency for this inverted S-shaped antenna 35 due to the occurrence of the dual resonance can be eliminated.

It is to be noted that the configuration of FIG. 18 may be modified to incorporate a bolt for changing a distance between the free end 36b and the device body 33 such that the thickness of the dielectric body 34 can be changed by the turning of the bolt to adjust the electrical length of the second strip-like conductor element 35b to be accurately equal to the electrical length of the first strip-like conductor element 35a.

Thus, according to this third embodiment, it also becomes possible to provide a portable radio communication device capable of eliminating the deterioration of the radiation efficiency due to the occurrence of the dual resonance on the antenna, without reducing the bandwidth.

Now, various configurations for further improving the performance of the portable radio communication device according to the present invention will be described.

Figure 19A:
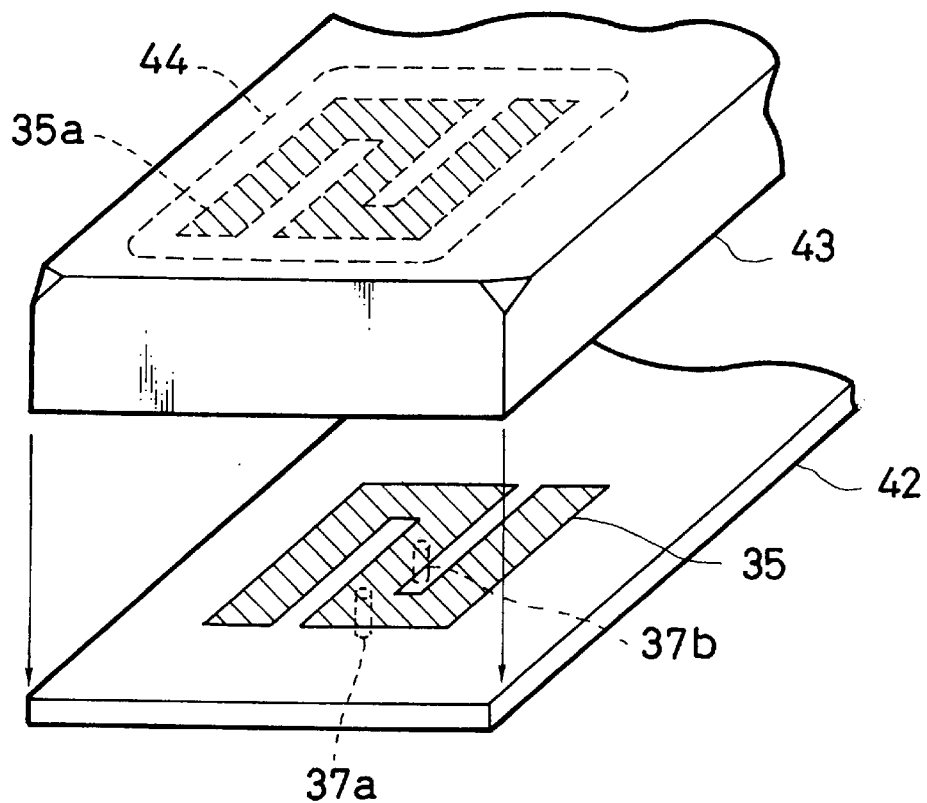
FIGS. 19A and 19B are perspective view and a cross sectional view of one configuration for improving an antenna performance in a portable radio communication device according to the present invention.
Figure 19B:
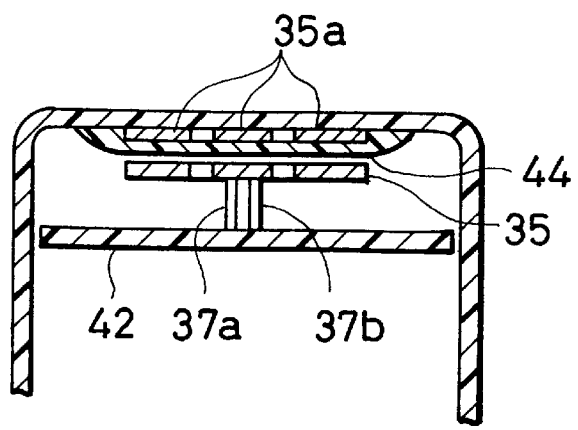

First, a configuration shown in FIGS. 19A and 19B comprises a circuit substrate 42 on which an inverted S-shaped antenna element 35 similar to that of third embodiment described above is mounted through a short-circuit line 37a and a feeder 37b as in the third embodiment described above, and a plastic casing 43 to be assembled with the circuit substrate 42 as shown in FIG. 19B. The plastic casing 43 has a passive element 35a in a shape corresponding to the inverted S-shaped antenna element 35 which is attached on an inner side of the plastic casing 43, at a position facing against the inverted S-shaped antenna element 35 when the plastic casing 43 and the circuit substrate 42 are assembled together, by means of a dielectric fixing member 44 such as an epoxy resin adhesive or an adhesive tape.

Here, the inverted S-shaped antenna element 35 and the passive element 35a have slightly different electrical lengths such that the resonant frequencies of the inverted S-shaped antenna element 35 and the passive element 35a are slightly different. In this manner, the bandwidth of the antenna can be widened further. The impedance matching between the feeder 37b and the inverted S-shaped antenna element 35 can be made by adjusting a distance between the short-circuit line 37a and the feeder 37b as well as their thicknesses.

Figure 20A:
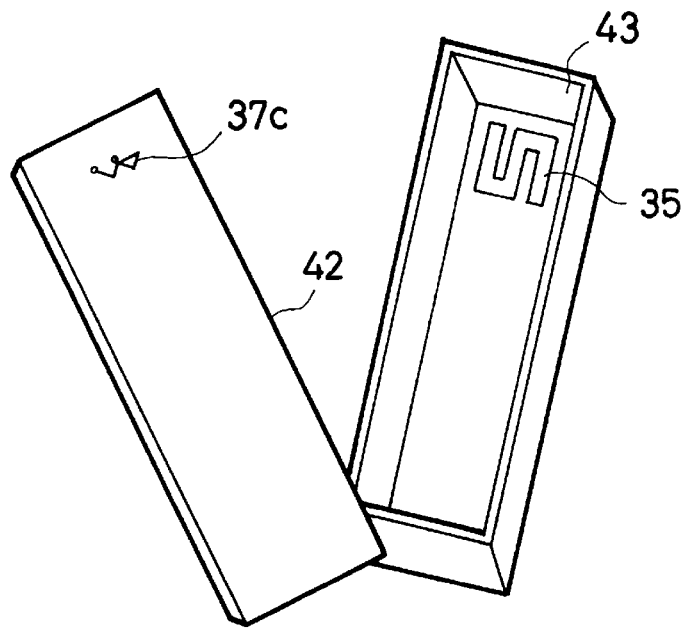
FIGS. 20A and 20B are perspective views of another configuration for improving an antenna performance in a portable radio communication device according to the present invention.
Figure 20B:
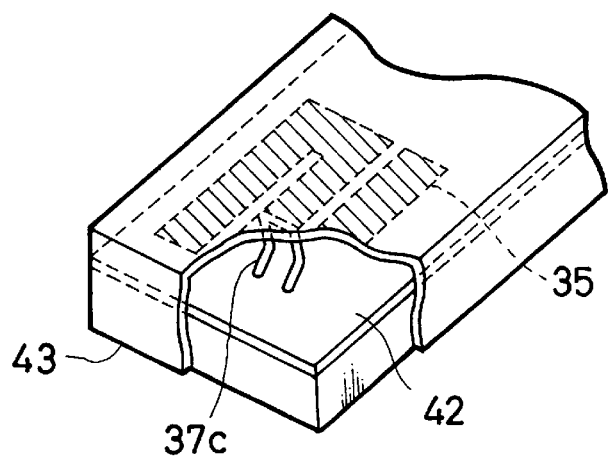

Next, a configuration shown in FIGS. 20A and 20B comprises a plastic casing 43 on an inner side of which an inverted S-shaped antenna element 35 similar to that of third embodiment described above is formed by the metal plating, and a circuit substrate 42 to be assembled with the plastic casing 43 as shown in FIG. 20B. The circuit substrate 42 has a feeding element 37c for feeding the inverted S-shaped antenna element 35 by making a contact with the inverted S-shaped antenna element 35 when the plastic casing 43 and the circuit substrate 42 are assembled together.

Figure 21A:
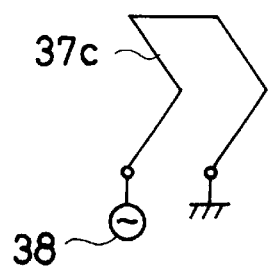
FIGS. 21A and 21B are diagrams of a feeding element used in the configuration of FIGS. 20A and 20B for illustrating its operation.
Figure 21B:
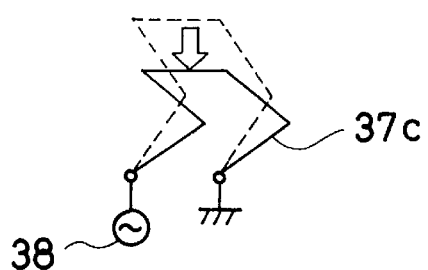

As shown in FIG. 21A, this feeding element 37c has a straight upper piece for making a contact with the inverted S-shaped antenna element 35 whose ends are supported by two crooked leg pieces one of them is connected with a current source 38 while the other one of them is grounded on the circuit substrate 42. Here, the feeding element 37c is made of an resilient material such that the crooked leg pieces can be deflected when a downward force is exerted on the straight upper piece as shown in FIG. 21B. Thus, when the plastic casing 43 and the circuit substrate 42 are assembled together, the straight upper piece of the feeding element 37c is pushed against the inverted S-shaped antenna element 35 on the plastic casing 43 to receive the downward force such that the crooked leg pieces of the feeding element 37c are deflected to stable maintain the straight upper piece of the feeding element 37c in contact with the inverted S-shaped antenna element 35.

In this manner, the contact between the inverted S-shaped antenna element 35 and the feeding element 37c can be stabilized for radio frequency components, so that the antenna characteristic can be stabilized. The impedance matching between the feeding element 37c and the inverted S-shaped antenna element 35 can be made by adjusting a distance between the two crooked leg pieces of the feeding element 37c as well as their thicknesses.

Figure 22A:
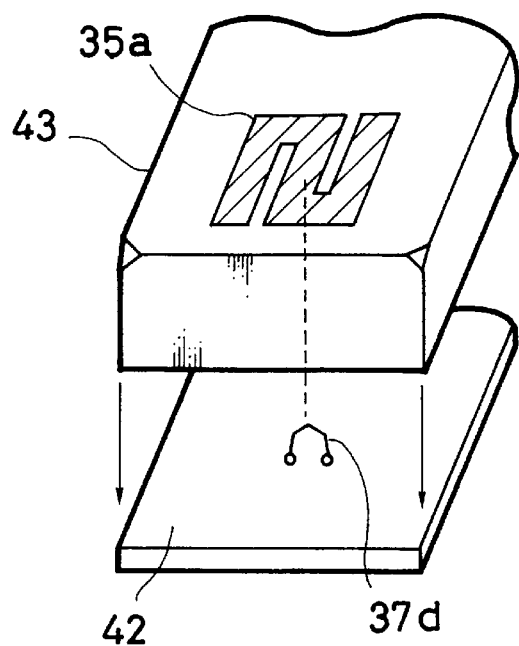
FIGS. 22A and 22B are perspective views of another configuration for improving an antenna performance in a portable radio communication device according to the present invention.
Figure 22B:
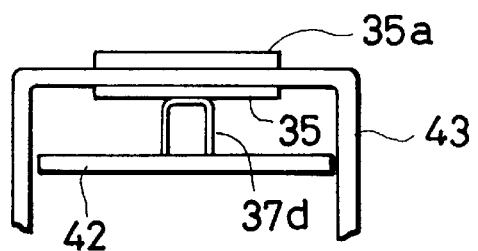

Next, a configuration shown in FIGS. 22A and 22B comprises a plastic casing 43 on an inner side of which an inverted S-shaped antenna element 35 similar to that of third embodiment described above is formed by the metal plating while on an outer side of which a passive element 35a in a shape corresponding to the inverted S-shaped antenna element 35 is formed by the metal plating at a position corresponding to that of the inverted S-shaped antenna element 35 on the inner side, and a circuit substrate 42 to be assembled with the plastic casing 43 as shown in FIG. 22B. The circuit substrate 42 has a feeding element 37d for feeding the inverted S-shaped antenna element 35 by making a contact with the inverted S-shaped antenna element 35 when the plastic casing 43 and the circuit substrate 42 are assembled together.

Figure 23A:
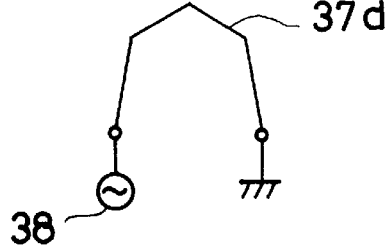
FIGS. 23A and 23B are diagrams of a feeding element used in the configuration of FIGS. 22A and 22B for illustrating its operation.
Figure 23B:
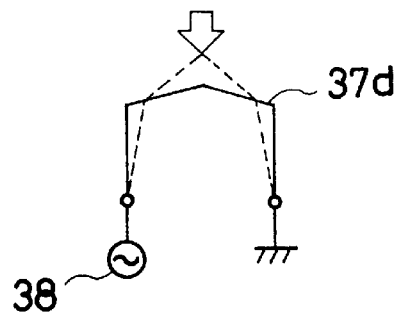

As shown in FIG. 23A, this feeding element 37d has a crooked upper piece for making a contact with the inverted S-shaped antenna element 35 whose ends are supported by two straight leg pieces one of them is connected with a current source 38 while the other one of them is grounded on the circuit substrate 42. Here, the feeding element 37d is made of an resilient material such that the crooked upper piece can be deflected when a downward force is exerted as shown in FIG. 23B. Thus, when the plastic casing 43 and the circuit substrate 42 are assembled together, the crooked upper piece of the feeding element 37d is pushed against the inverted S-shaped antenna element 35 on the plastic casing 43 to receive the downward force thereon such that it is deflected to maintain the contact with the inverted S-shaped antenna element 35.

In this manner, the contact between the inverted S-shaped antenna element 35 and the feeding element 37d can be stabilized for radio frequency components, so that the antenna characteristic can be stabilized. The impedance matching between the feeding element 37d and the inverted S-shaped antenna element 35 can be made by adjusting a distance between the two straight leg pieces of the feeding element 37d as well as their thicknesses.

In addition, by setting the inverted S-shaped antenna element 35 and the passive element 35a to have slightly different electrical lengths, the resonant frequencies of the inverted S-shaped antenna element 35 and the passive element 35a can be made to be slightly different such that the bandwidth of the antenna can be widened further.

Figure 24A:
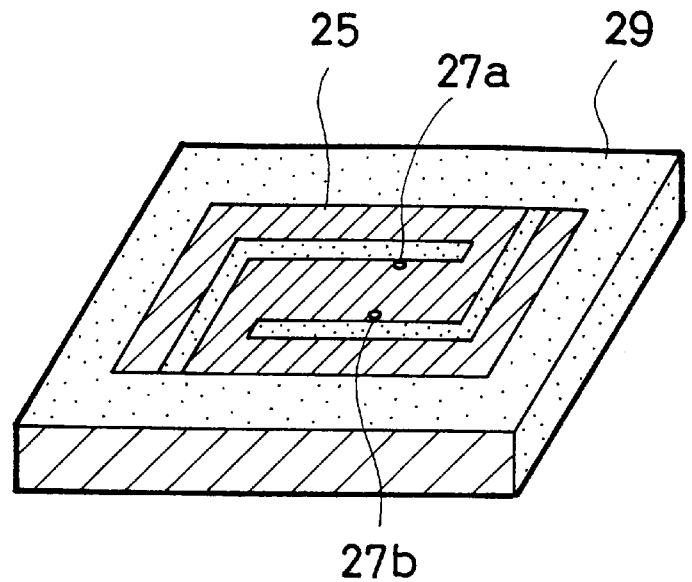
FIGS. 24A and 24B are perspective views of front and back sides of another configuration for improving an antenna performance in a portable radio communication device according to the present invention.
Figure 24B:
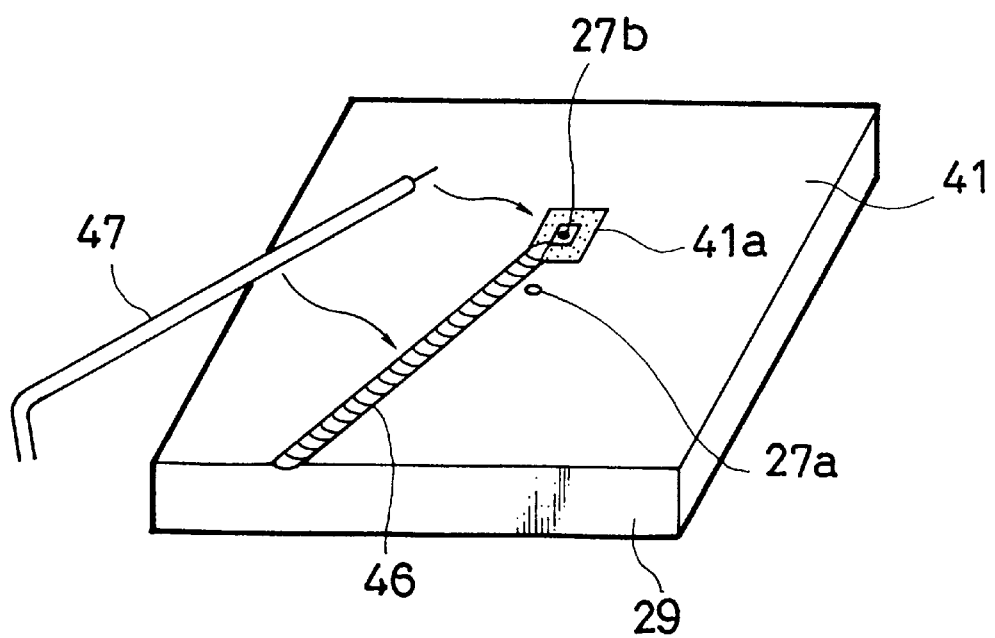

Next, a configuration shown in FIGS. 24A and 24B comprises a spiral shaped antenna element 25 similar to that of second embodiment described above is formed by etching grooves on a copper thin film formed over a dielectric substrate 29 and attaching a short-circuit line 27a and a feeder 27b as in the second embodiment described above.

Figure 25A:
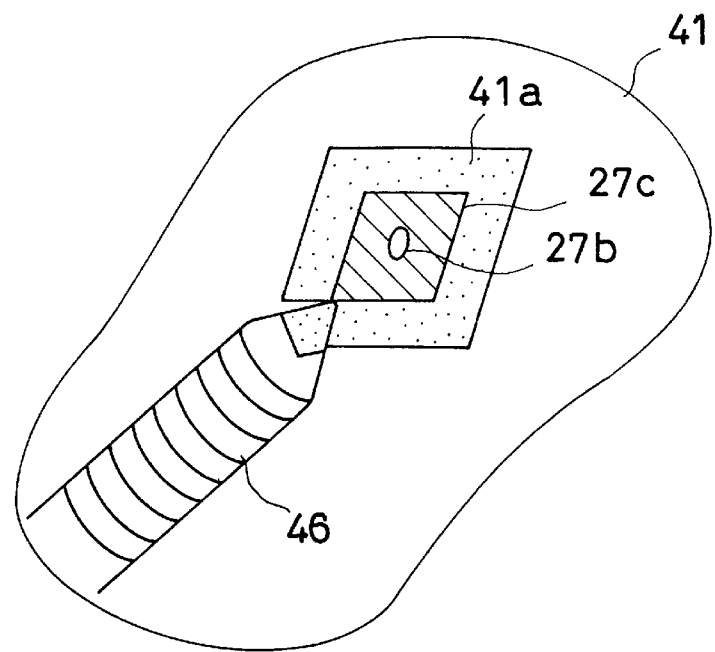
FIGS. 25A and 25B are enlarged illustrations of a feeding line connection portion in the configuration of FIGS. 24A and 24B.
Figure 25B:
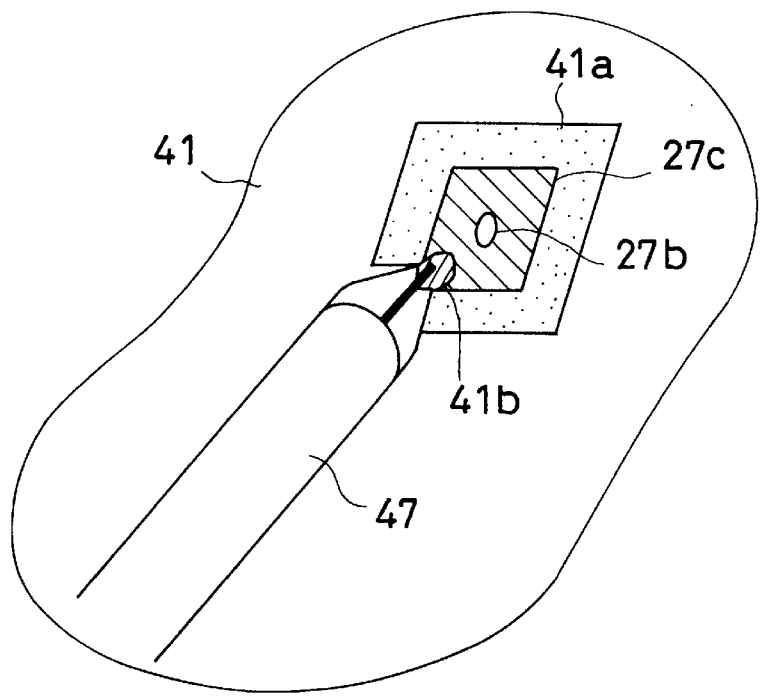

Here, as shown in FIG. 24B, a back side of the dielectric substrate 29 has a ground plate 41 with a ring shaped through hole 41a around the feeder 27b and a metal plated groove 46 between the through hole 41a and an edge of the dielectric substrate 29 for housing a coaxial feeding line 47 to be connected with the feeder 27b. Here, as shown in FIGS. 25A and 25B, the coaxial feeding line 47 is housed in the groove 46 and attached by a soldering 41b to a conductive piece 27c provided around the feeder 27b and surrounded by the through hole 41a.

Figure 26A:
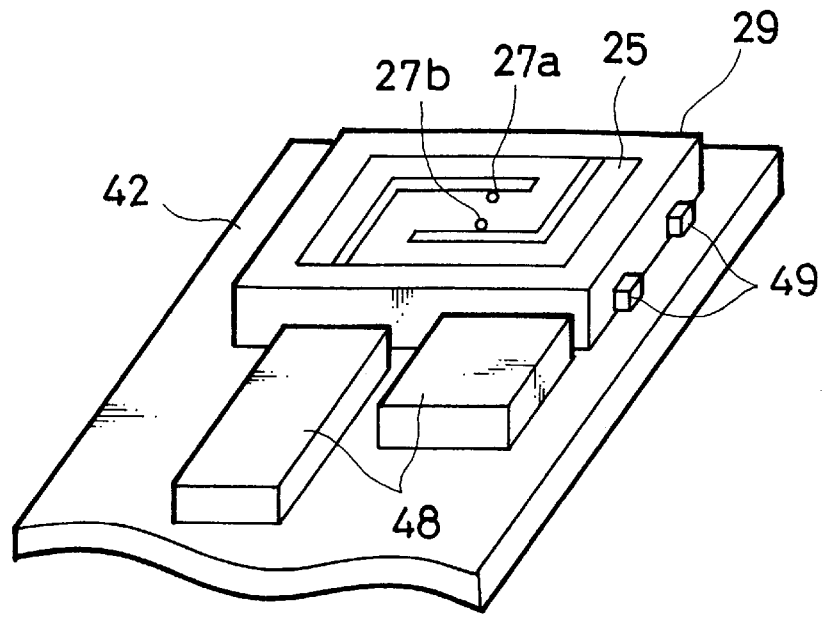
FIGS. 26A and 26B are perspective views of the configuration of FIGS. 24A and 24B in a state of being assembled on a circuit substrate.
Figure 26B:
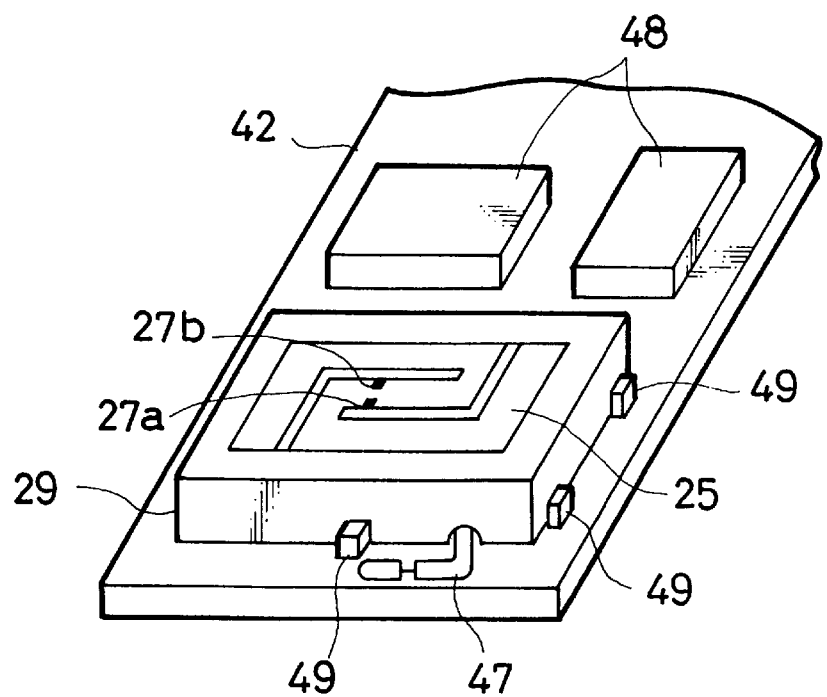

Then, as shown in FIGS. 26A and 26B, the dielectric substrate 29 is mounted on a circuit substrate 42 by means of substrate positioning boss pieces 49 provided on the circuit substrate 42, along with other circuit elements 48.

Figure 27A:
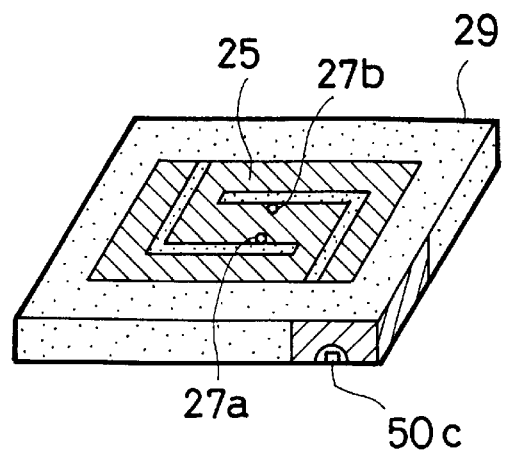
FIGS. 27A and 27B are perspective views of front and back sides of another configuration for improving an antenna performance in a portable radio communication device according to the present invention.
Figure 27B:
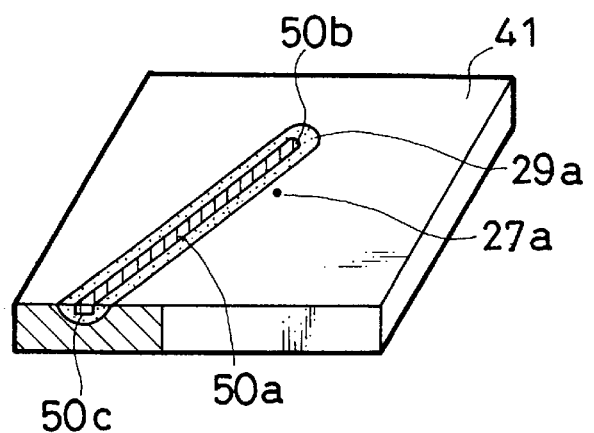
Figure 27C:
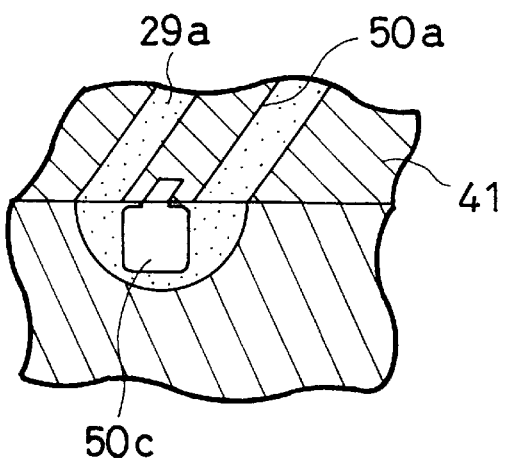
FIG. 27C is an enlarged illustration of a connector portion in the configuration of FIGS. 27A and 27B.

Next, a configuration shown in FIGS. 27A and 27B comprises a spiral shaped antenna element 25 similar to that of second embodiment described above is formed by etching grooves on a copper thin film formed over a dielectric substrate 29 and attaching a short-circuit line 27a and a feeder 27b as in the second embodiment described above.

Here, as shown in FIG. 27B, a back side of the dielectric substrate 29 has a ground plate 41 with a coplanar type micro-strip line 50a connected with the feeder 27b at a feeding point 50b and a connector 50c at an edge of the dielectric substrate 29. Here, the coplanar type micro-strip line 50a and the connector 50c are separated from the ground plate 41 by being surrounded by a dielectric strip 29a which is a part of the dielectric substrate 29.

Figure 28:
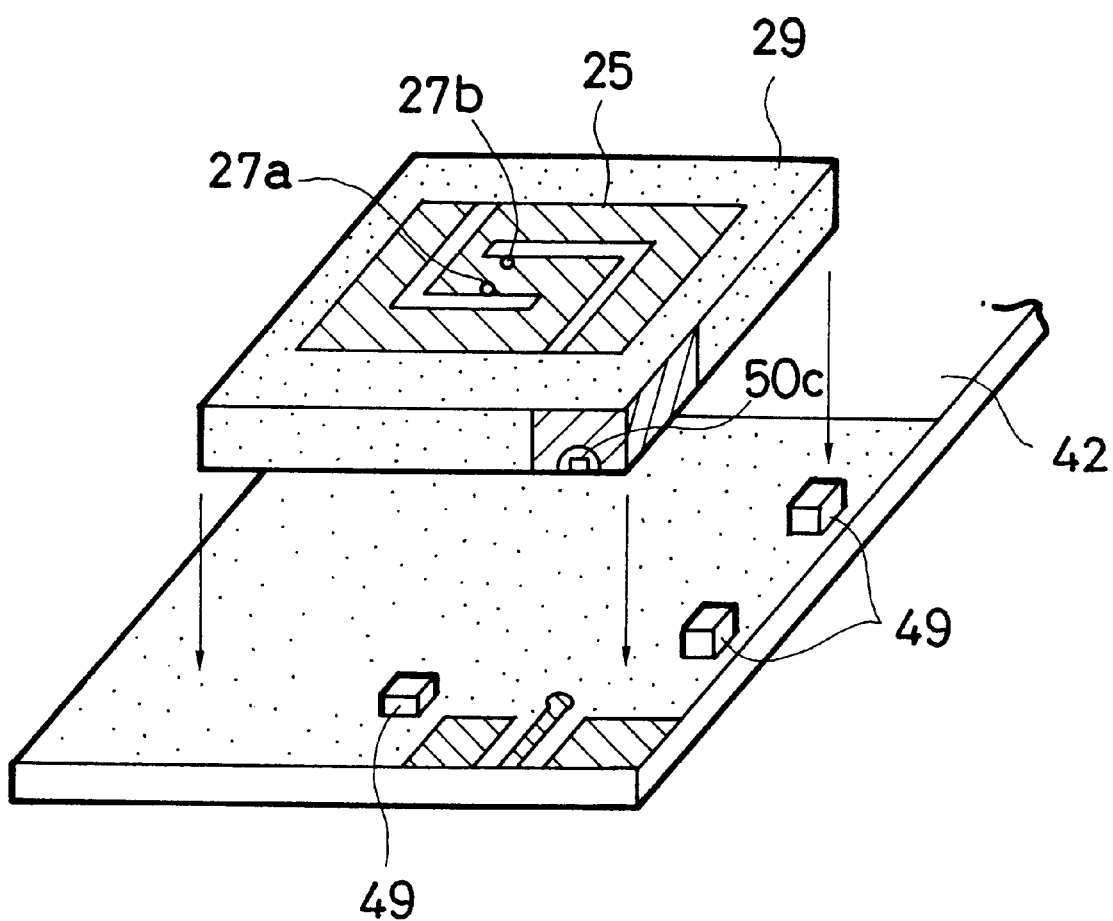
FIG. 28 is a perspective view of the configuration of FIGS. 27A and 27B in a state of being assembled on a circuit substrate.

Then, as shown in FIG. 28, the dielectric substrate 29 is mounted on a circuit substrate 42 by means of substrate positioning boss pieces 49 provided on the circuit substrate 42.

Figure 29A:
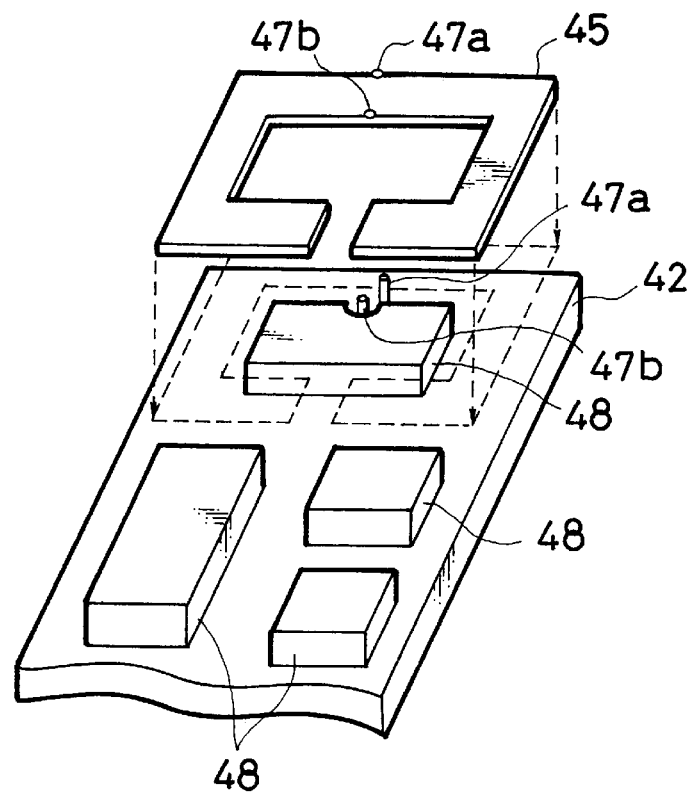
FIGS. 29A and 29B are perspective views of another configuration for improving an antenna performance in a portable radio communication device according to the present invention.
Figure 29B:
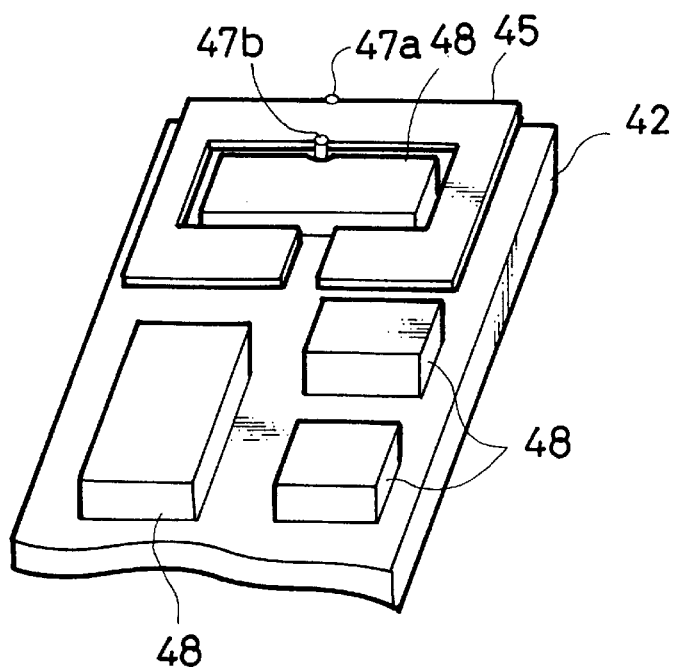

Next, a configuration shown in FIGS. 29A and 29B comprises an approximately C-shaped antenna element 45 attached with a short-circuit line 47a and a feeder 47b, similarly to the first to third embodiments described above, which is mounted on a circuit substrate 42 along with other circuit components 48, where one of the other circuit components 48 is arranged to be located within a central bore section of the C-shaped antenna element 45.

In this manner, the overall shape of the antenna according to the present invention may be modified in accordance with the other circuit elements to be arranged together.

Figure 30A:
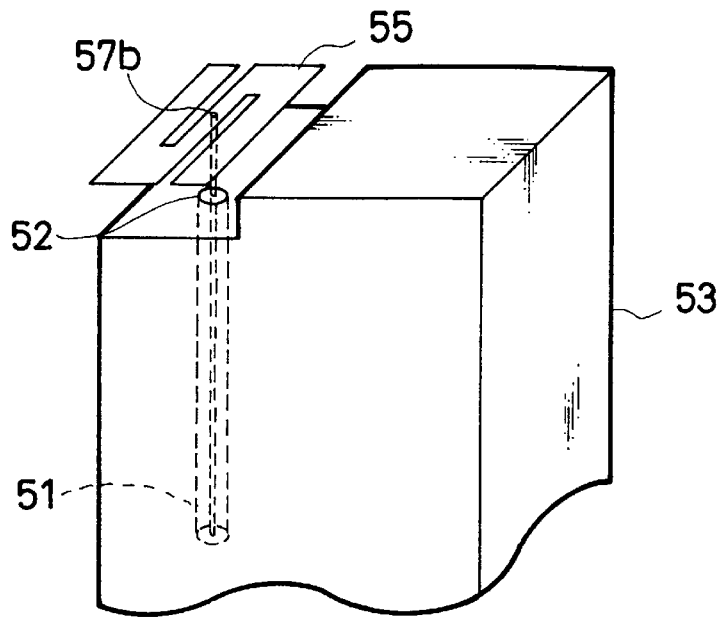
FIGS. 30A and 30B are perspective views of another configuration for improving an antenna performance in a portable radio communication device according to the present invention.
Figure 30B:
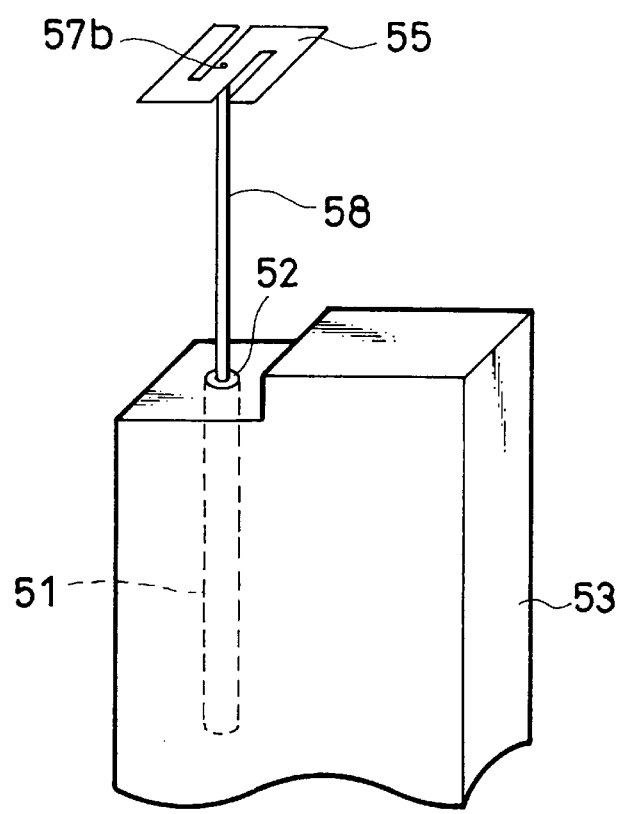

Next, a configuration shown in FIGS. 30A and 30B comprises a box shaped device casing 53 having a cut out portion along one edge, a cylindrical conductor sleeve 51 fixed to the device casing 53 by a connector member 52 at the cut out portion and housed within the device casing 53, a rod shaped antenna element 58 slidable along the connector member 52 in and out of the cylindrical conductor sleeve 51, and an S-shaped antenna element 55 similar to those of the first to third embodiments described above which is attached at a tip end of the rod shaped antenna element 58 at a feeding point 57b.

Figures 31A, 31B:
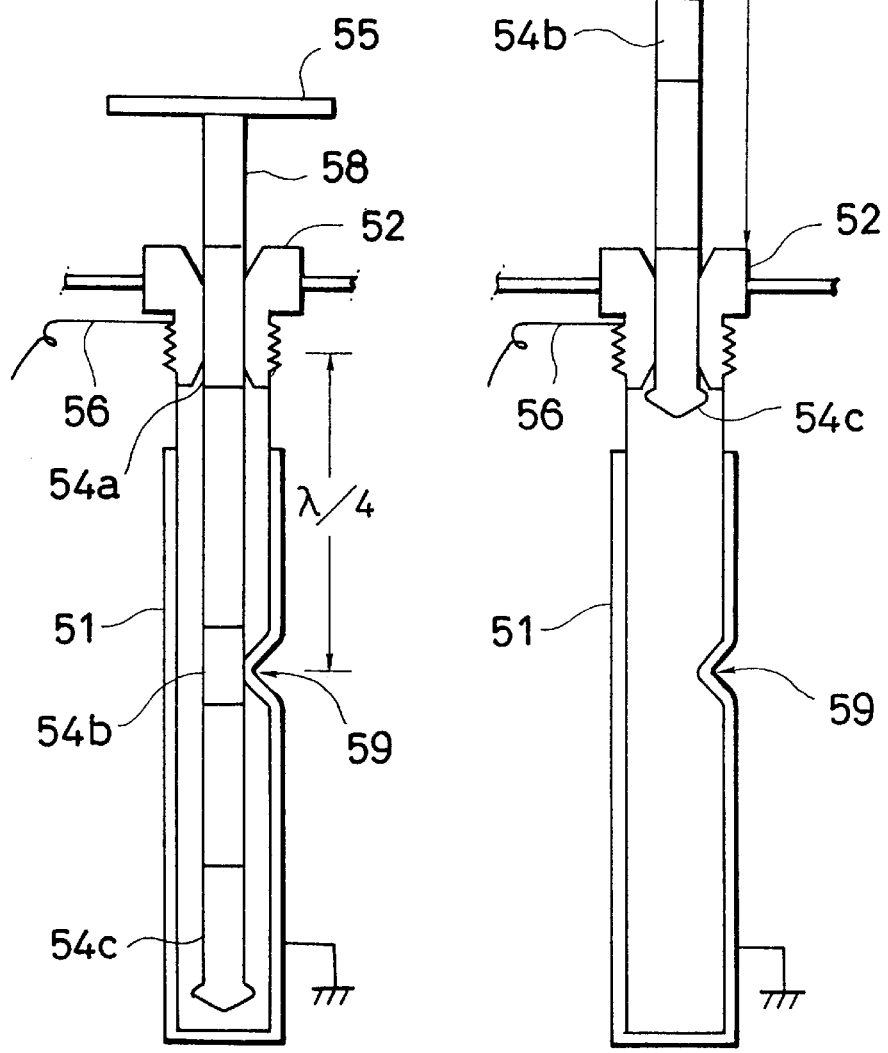
FIGS. 31A and 31B are cross sectional views of an antenna portion in the configuration of FIGS. 30A and 30B.

In further detail, as shown in FIGS. 31A and 31B, the cylindrical conductor sleeve 51 has an indented portion 59 at a distance of approximately λ/4 from the connector member 52, where λ is a wavelength of a radio signal to be used in the radio communication, while the connector member 52 is attached with a feeding line 56, and the rod shaped antenna element 58 has upper, middle and lower contact sections 54a, 54b, and 54c.

Here, when the rod shaped antenna element 58 is slid into the cylindrical conductor sleeve 51 all the way down as shown in FIG. 31A, the upper contact section 54a makes a contact with the connector member 52 such that this upper contact section 54a functions as a feeder for the S-shaped antenna element 55 while the middle contact section 54b makes a contact with the indented portion 59 of the cylindrical conductor sleeve 51 such that this middle contact section 54b is short-circuited for radio frequency components, as shown in FIG. 31A. In this case, as the indented portion 59 of the cylindrical conductor sleeve 51 is distanced by approximately λ/4 from the connector member 52 so that the input impedance on the cylindrical conductor sleeve 51 side from the connector member 52 is nearly that of an open state. Consequently, when the rod shaped antenna member 58 is contained inside the cylindrical conductor sleeve 51, the cylindrical conductor sleeve 51 is effectively ignorable in terms of the radio frequency components. In addition, by setting a distance between the upper contact section 54a of the rod shaped antenna element 58 and the S-shaped antenna element 55 to be greater than or equal to λ/16, it becomes possible to make the input impedance matching between the antenna and the feeding line 56 without using any matching circuit.

On the other hand, when the rod shaped antenna element 58 is slid out from the cylindrical conductor sleeve 51 all the way up as shown in FIG. 31B, the lower contact section 54c makes a contact with the connector member 52 such that this lower contact section 54c functions as a feeder for the S-shaped antenna element 55. Here, the distance between the lower contact section 54c and the S-shaped antenna element 55 is set to be λ/2 such that the input impedance matching can be made between the antenna and the feeding line 56 when the rod shaped antenna element 58 is fully extended.

Thus, in this configuration of FIGS. 30A and 30B, the rod shaped antenna element 58 within the device body 53 while the device is carried or used in a strong electric field region, and the device can be used by extending the rod shaped antenna element 58 in the weak electric field region.

Now, various configurations for further reducing the interaction of the antenna with the user's body in the portable radio communication device according to the present invention will be described.

Figure 32:
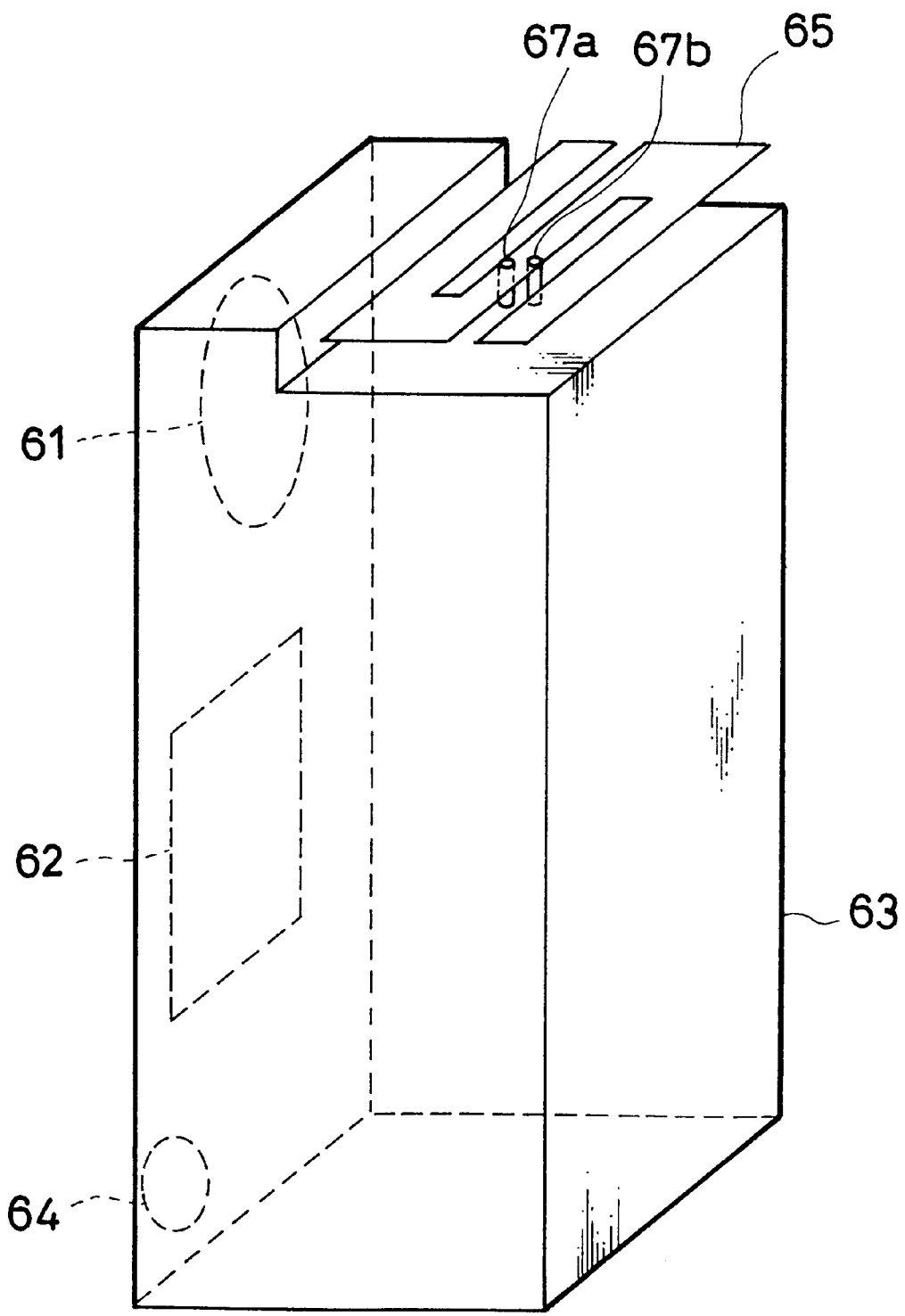
FIG. 32 is a perspective view of another configuration for improving an antenna performance in a portable radio communication device according to the present invention.

First, a configuration shown in FIG. 32 comprises a box shaped device casing 63 having a cut out portion along one edge, and an S-shaped antenna element 65 similar to those of the first to third embodiments described above which is attached at the cut out portion of the device casing 63 through a short-circuit line 67a and a feeder 67b just as in the second and third embodiments described above. In addition, the device casing 63 is further equipped with a speaker 61, a keyboard 62, and a microphone 64, all of which are located on one side of the device body 63 facing away from the cut out portion of the device body 63 at which the S-shaped antenna element 65 is located.

In this manner, it is possible to reduce the radiation from the antenna toward the user while the user operates the device by facing toward that one side of the device body 63 on which the speaker 61, the keyboard 62, and the microphone 64 are located such that the influence of the user on the antenna characteristic can be reduced.

Figure 33A:
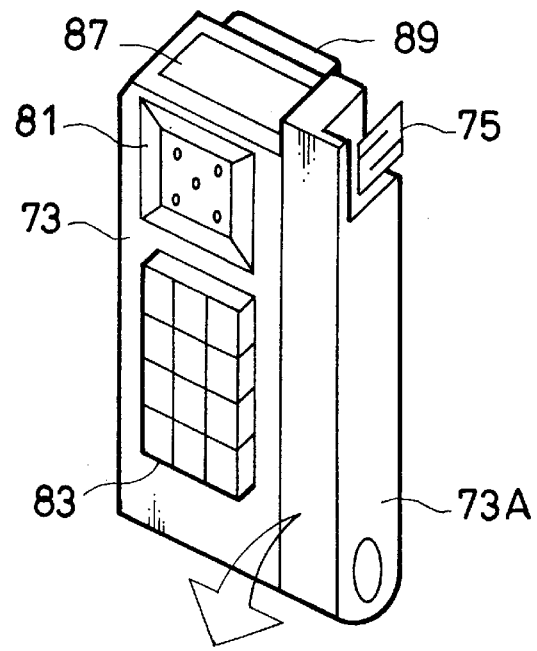
FIGS. 33A, 33B, and 33C are perspective views of another configuration for improving an antenna performance in a portable radio communication device according to the present invention.
Figure 33B:
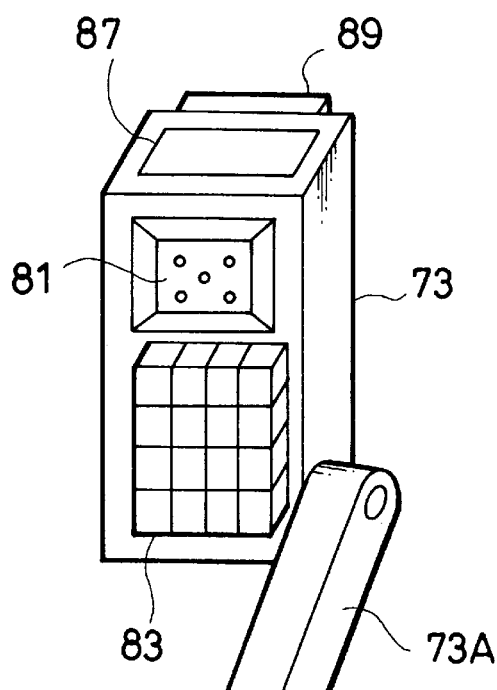
Figure 33C:
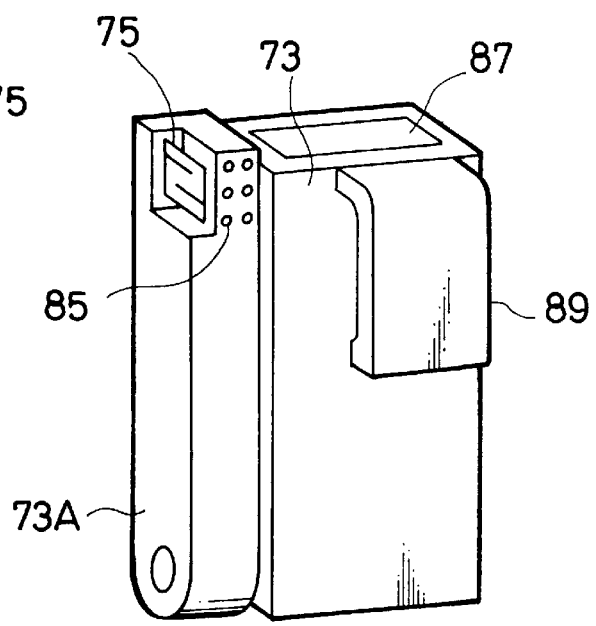

Next, a configuration shown in FIGS. 33A, 33B, and 33C comprises a box shaped device casing 73 having a pivotable handle portion 73A, where the handle portion 73A has a cut out portion near its free end at which an inverted S-shaped antenna element 75 similar to that of the third embodiment described above is attached. In addition, the device casing 73 is further equipped with a speaker 81 and a keyboard 82 located on a front side, a display 67 located on an upper side, and a hook 89 located on a back side, while the handle portion 73A is further equipped with a microphone 85 near a free end of the handle portion 73A.

In this manner, it is possible to reduce the radiation from the antenna toward the user when the user operates the device by facing toward the front side of the device body 73 on which the speaker 81 and the keyboard 83 are located while pivoting the handle portion 73A as shown in FIG. 33B to point the microphone 85 toward the user, such that the influence of the user on the antenna characteristic can be reduced. In addition, this configuration is more convenient for carrying the device as the handle portion 73A can be pivoted to a position along the device body 73 as shown in FIG. 33C in a case of carrying the device, such that the entire device can be put into a compact size.

Figure 34A:
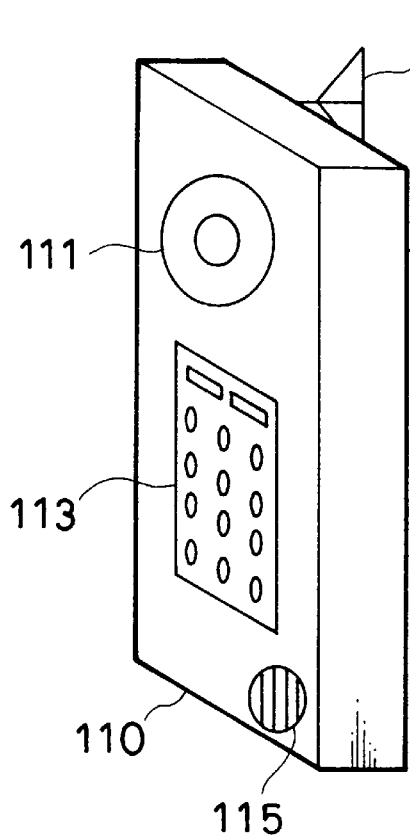
FIGS. 34A and 34B are perspective views of front and back sides of another configuration for improving an antenna performance in a portable radio communication device according to the present invention.
Figure 34B:
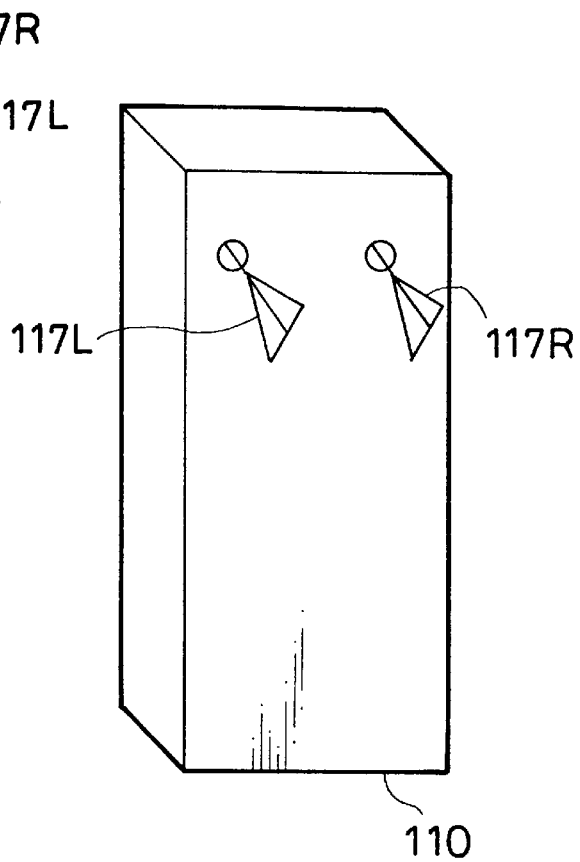

Next, a configuration shown in FIGS. 34A and 34B comprises a box shaped device casing 110 having a speaker 111, a keyboard 113, and a microphone 115 on a front side of the device body 110, and an antenna element 117L and a passive element 117R forming an array antenna which are arranged along a horizontal line on a back side of the device body 110 facing away from the front side on which the speaker 111 is located.

Figure 35A:
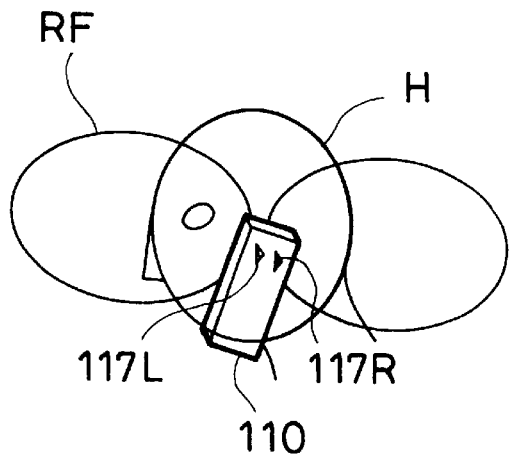
FIGS. 35A and 35B are illustrations of a radiation field realized by the configuration of FIGS. 34A and 34B.
Figure 35B:
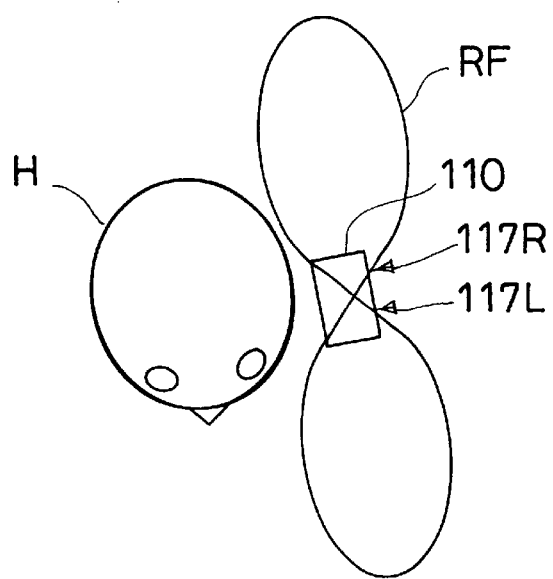

In this manner, the array antenna formed by the antenna element 117L and the passive element 117R has a directivity as indicated in FIGS. 35A and 35B in which the radiation field RF of the array antenna is directed along a horizontal line on which the antenna element 117L and the passive element 117R are arranged, which is not pointing toward the user's head H. Here, the antenna element 117L and the passive element 117R are also pointing in a normal direction of the back side of the device casing 110, so that the radio frequency currents flowing out of the feeding point of the antenna element 117L produces a relatively large current distribution on the antenna element 117L and the back side of the device casing 110 and a relatively small current distribution on the front side of the device casing 110. The currents distributed on the front side of the device casing 110 are going to interact with the user's body in a vicinity of the front side of the device casing 110, but the amount of such currents can be ignorably small in this configuration. On the other hand, the currents distributed on the antenna element 117L are separated from the user's body by a thickness of the device casing 110 to begin with and furthermore directed away from the user's body, so that the projection image induced by these currents on the user's body can be quite small as the user's body is not a very good conductor. Similarly, the projection image induced by the currents distributed on the back side of the device casing 110 on the user's body can be small as these currents are separated from the user's body by the thickness of the device casing 110 and the user's body is not a very good conductor.

Thus, in this configuration, it is possible to reduce the radiation from the antenna toward the user while the user operates the device by facing toward the front side of the device body 110 such that the interaction of the antenna with the user's body that influences the antenna characteristic can be reduced.

Figure 36:
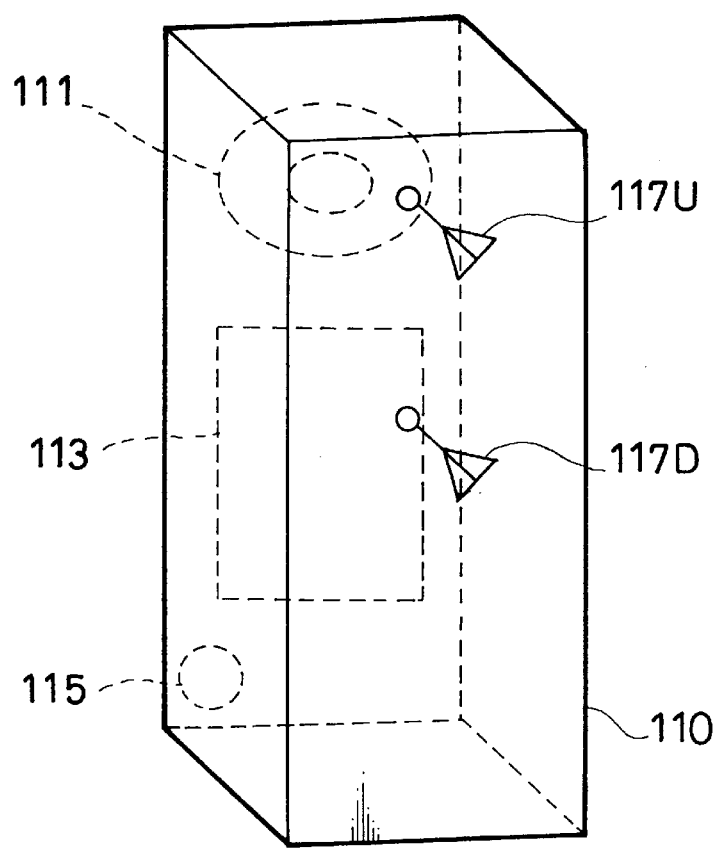
FIG. 36 is a perspective view of a back side of another configuration for improving an antenna performance in a portable radio communication device according to the present invention.

Next, a configuration shown in FIG. 36 comprises a box shaped device casing 110 having a speaker 111, a keyboard 113, and a microphone 115 on a front side of the device body 110, and an antenna element 117D and a passive element 117U forming an array antenna which are arranged along a vertical line on a back side of the device body 110 facing away from the front side on which the speaker 111 is located.

Figure 37A:
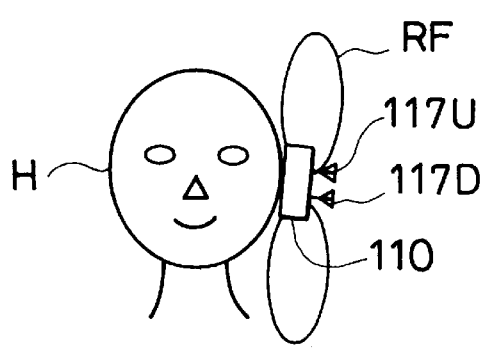
FIGS. 37A and 37B are illustrations of a radiation field realized by the configuration of FIG. 36.
Figure 37B:
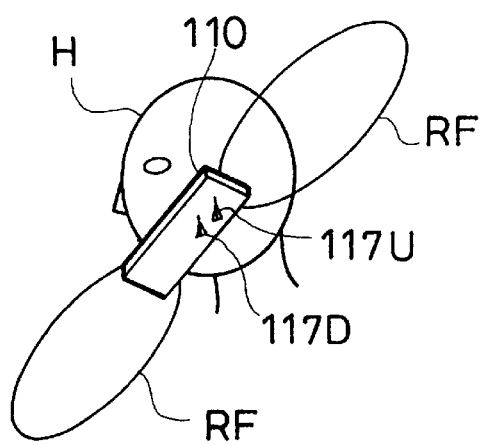

In this manner, the array antenna formed by the antenna element 117D and the passive element 117U has a directivity as indicated in FIGS. 37A and 37B in which the radiation field RF of the array antenna is directed along a vertical line on which the antenna element 117D and the passive element 117U are arranged, which is not pointing toward the user's head H, so that the effect similar to that of the configuration of FIGS. 34A and 34B can also be obtained by this configuration of FIG. 36.

Here, it is to be noted that the antenna element 117D in this configuration can be any type of antenna usually used in the radio communication device, such as a $\lambda/4$ monopole antenna, a plate shaped inverted F-type antenna, a normal mode helical antenna, a micro-strip antenna, etc. It is also possible to employ the antenna such as $\lambda/2$ monopole antenna, $\lambda/2$ sleeve antenna with balun, etc. to reduce the currents flowing over the device casing such that the influence of the user's body on the antenna characteristic as well as the interaction of the user's body in a vicinity of the device casing with the radio frequency currents can be reduced. The passive element 117U can be formed from the same type of antenna as the antenna element 117D, with a load inserted at the feeding point such that the radiation field directivity can be adjusted by varying the value of this load.

Figure 38A:
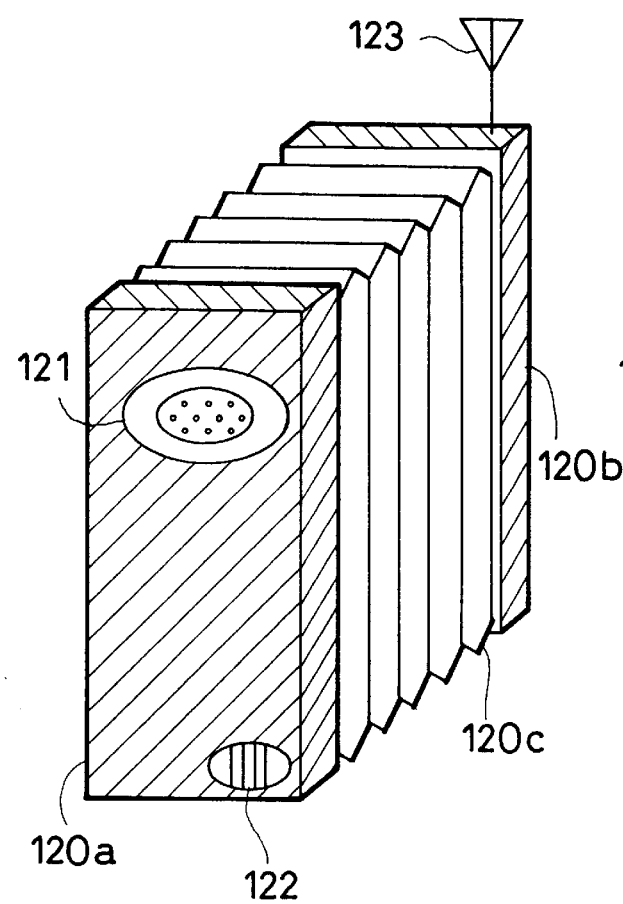
FIGS. 38A and 38B are perspective views of another configuration for improving an antenna performance in a portable radio communication device according to the present invention.
Figure 38B:
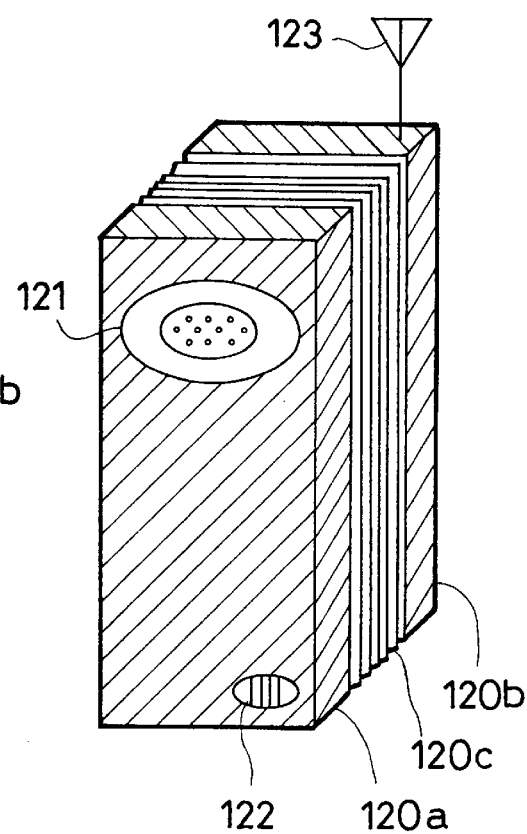

Next, a configuration shown in FIGS. 38A and 38B comprises a front side device casing 120a having a speaker 121 and a microphone 122 on its front side, a rear side device casing 120b having an antenna element 123 on its upper side, and a bellows 120c supporting the front side device casing 120a and the rear side device casing 120b together at a variable relative distance. In this configuration, the rear side device casing 120b is covered by a conductor body for shielding the circuit components contained inside, and the front side device casing 120a and the rear side device casing 120b are connected with each other through signal lines (not shown) provided within the bellows 120c. Here, by collectively providing all the radio frequency circuit components within the rear side device casing 120b, the signal lines connecting the front side device casing 120a and the rear side device casing 120b can be the low frequency signal lines. The use of the low frequency signal lines is advantageous in that the variation of the impedance due to the deformation of the signal lines that can be caused by the folding and unfolding of the bellows 120c is smaller for the low frequency signal lines compared with the radio frequency signal lines.

In this manner, it is possible to reduce the radiation from the antenna toward the user when the user operates the device by facing toward the front side device body 120a on which the speaker 121 and the microphone 122 are located while unfolding the bellows 120c as shown in FIG. 38A to place the antenna 123 away from the user's body, such that the influence of the user on the antenna characteristic can be reduced. On the other hand, at a time of carrying the device, the bellows 120c can be folded as shown in FIG. 38B such that it is more convenient for carrying the device as the entire device can be put into a compact size.

Next, a configuration shown in FIGS. 39A and 39B comprises a main device casing 120 having a speaker 121 and a microphone 122 on its front side, and a drawer portion 126 having an antenna element 123 on its back side, where the drawer portion 126 can be freely pushed in and pulled out from the main device casing 120.

Here, the drawer portion 126 has a scale 128 as shown in FIG. 39C attached on its side face, which indicates the maximum directivity gains corresponding to the respective amounts of pulling out the drawer portion 126 from the main device casing 120 which are either calculated or measured in advance, such that the user can easily recognizes the influence of the user's body on the antenna characteristic by reading this scale 128.

Figure 40A:
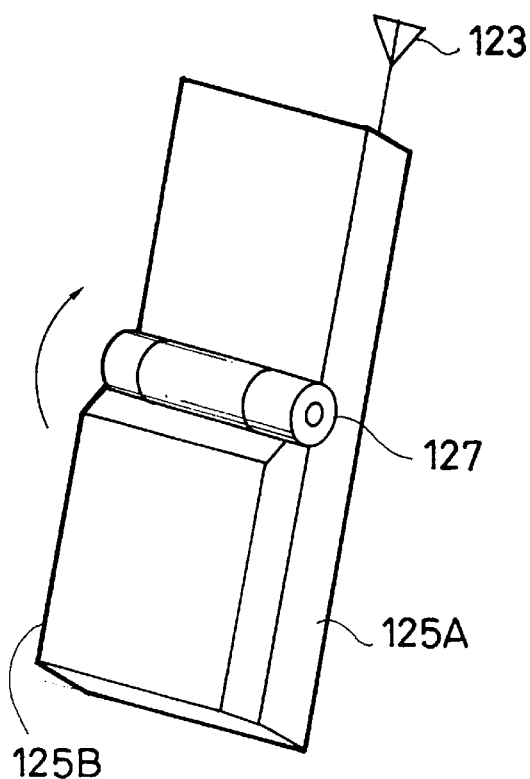
FIGS. 40A and 40B are perspective views of another configuration for improving an antenna performance in a portable radio communication device according to the present invention.
Figure 40B:
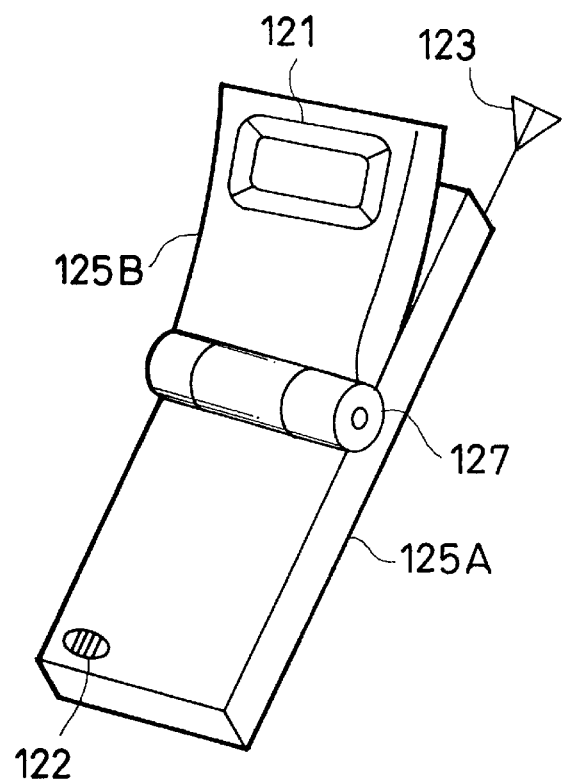

Next, a configuration shown in FIGS. 40A and 40B comprises a main device casing 125A and a pivotable device casing 125B in a size approximately half of that of the main device casing 125A which is pivotally supported at a middle of the main device casing 125A by a pivot mechanism 127. The main device casing 125A has an antenna 123 on its upper side, and a microphone 122 on its lower front side. While the pivotable device casing 125B has a speaker 121 on its front side when the pivotable device casing 125B is opened up as shown in FIG. 40B. In this state of being opened up, the speaker 121 and the microphone 122 are separated by a distance approximately equal to that between the ear and the mouth of the user, and this distance between the speaker 121 and the microphone 122 can be adjusted by pivoting the pivotable device casing 125B for desired amount.

Figure 41A:
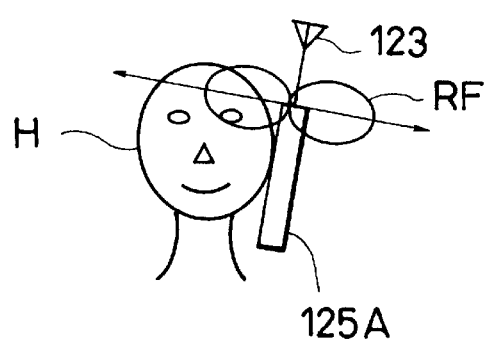
FIGS. 41A and 42B are illustrations of a radiation field realized by the configuration of FIGS. 40A and 40B.
Figure 41B:
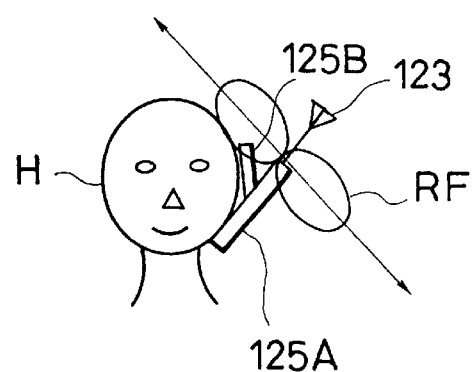

In this manner, it is possible to reduce the radiation from the antenna toward the user when the user operates the device by using the device in a manner of a telephone while opening the pivotable device casing 125B as shown in FIG. 40B in which the radiation field RF of the the antenna 123 is pointing away from the user's head H as shown in FIGS. 41A and 41B, such that the influence of the user on the antenna characteristic can be reduced. On the other hand, at a time of carrying the device, the pivotable device casing 125B can be closed as shown in FIG. 40A such that it is more convenient for carrying the device as the entire device can be put into a compact size.

Figure 42A:
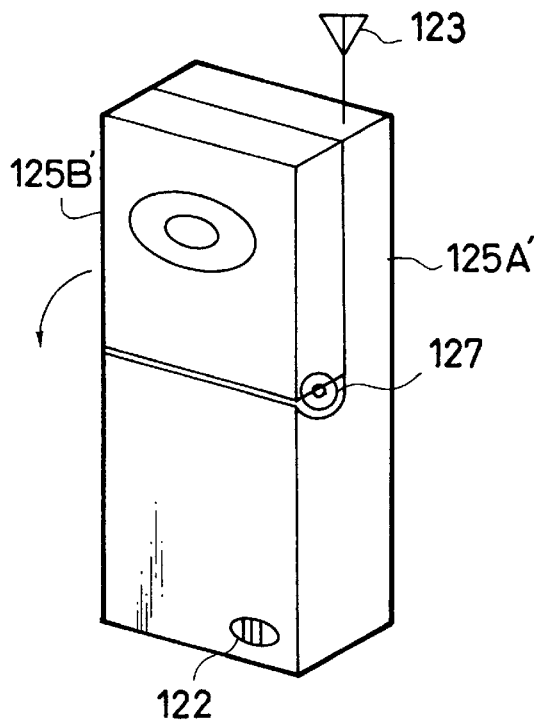
Figure 42B:
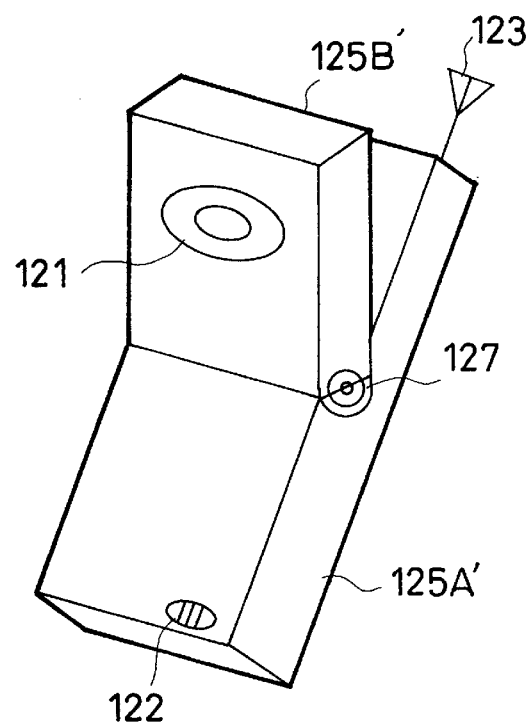

Next, a configuration shown in FIGS. 42A and 42B comprises a main device casing 125A' and a pivotable device casing 125B' in a size approximately half of that of the main device casing 125A' which is pivotally supported at a middle of the main device casing 125A' by a pivot mechanism 127, where the main device casing 125A' is formed to have a thickness twice as thick as a thickness of the pivotable device casing 125B', such that the pivotable device casing 125B' can be freely flattened as shown in FIG. 42A or popped out forward from the main device casing 125A' as shown in FIG. 42B. The main device casing 125A' has an antenna 123 on its upper side, and a microphone 122 on its lower front side, while the pivotable device casing 125B has a speaker 121 on its front side.

In this manner, it is possible to reduce the radiation from the antenna toward the user when the user operates the device by using the device in a manner of a telephone while popping out the pivotable device casing 125B' forward as shown in FIG. 42B in which the radiation field RF of the the antenna 123 is pointing away from the user's head, just as in the configuration of FIGS. 40A and 40B described above, such that the influence of the user on the antenna characteristic can be reduced. On the other hand, at a time of carrying the device, the pivotable device casing 125B' can be flattened out as shown in FIG. 42A such that it is more convenient for carrying the device as the entire device can be put into a compact size.

Figure 43A:
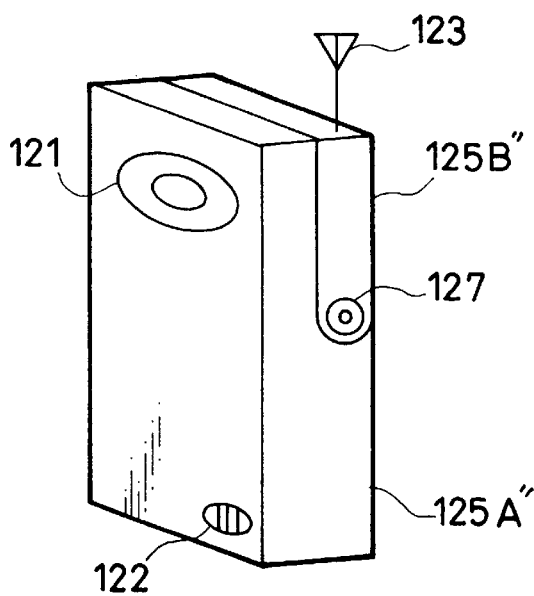
FIGS. 43A and 43B are perspective views of another configuration for improving an antenna performance in a portable radio communication device according to the present invention.
Figure 43B:
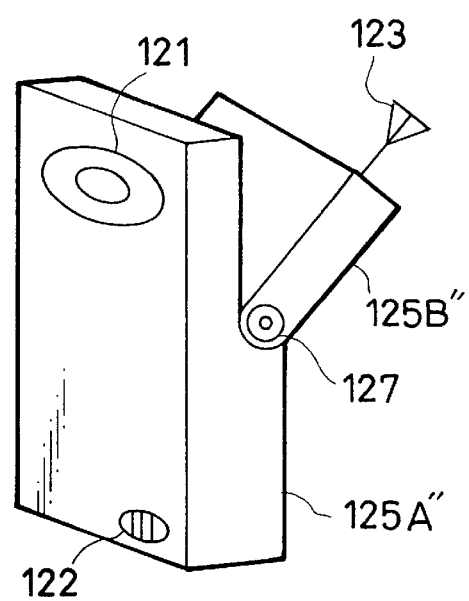

Next, a configuration shown in FIGS. 43A and 43B comprises a main device casing 125A" and a pivotable device casing 125B" in a size approximately half of that of the main device casing 125A" which is pivotally supported at a middle of the main device casing 125A" by a pivot mechanism 127, where the main device casing 125A" is formed to have a thickness twice as thick as a thickness of the pivotable device casing 125B", such that the pivotable device casing 125B" can be freely flattened as shown in FIG. 43A or popped out backward from the main device casing 125A" as shown in FIG. 43B. The main device casing 125A" has an a speaker 121 and a microphone 122 on its front side, while the pivotable device casing 125B" has an antenna 123 on its upper side.

In this manner, it is possible to reduce the radiation from the antenna toward the user when the user operates the device by using the device in a manner of a telephone while popping out the pivotable device casing 125B" backward as shown in FIG. 43B in which the radiation field RF of the the antenna 123 is pointing away from the user's head, just as in the configuration of FIGS. 40A and 40B described above, such that the influence of the user on the antenna characteristic can be reduced. On the other hand, at a time of carrying the device, the pivotable device casing 125B" can be flattened out as shown in FIG. 43A such that it is more convenient for carrying the device as the entire device can be put into a compact size.

Next, a configuration shown in FIG. 44 comprises a box shaped device casing 130, a crank shaped feeding line 137 mounted on the device casing 130, and a rod shaped antenna element 139 attached at a tip end of the feeding line 137. As shown in FIG. 44, the crank shaped feeding line 137 has a vertical portion 137a of a length d which is about a several tenth of the wavelength $\lambda$ of the radio signal to be used in the radio communication and attached to the device casing 130, a right angle corner at a point "n", a horizontal portion 137b of a length $\lambda/4$ between points "n" and "m" extending in parallel to the top surface of the device casing 130, a right angle corner at a point "m", and a vertical portion 137c of a length $\lambda/4$ between points "m" and "p" extending upwards from the point "m", while the rod shaped antenna element 139 is of a length $\lambda/4$ and extending upwards from the point "p".

In this configuration of FIG. 44, the rod shaped antenna element 139 and a vertical portion 137c of the crank shaped feeding line 137 effectively functions as $\lambda/2$ dipole antenna having a feeding point at the point "p" as indicated in FIG. 45A, because the horizontal portion 137b of the crank shaped feeding line 137 and the device casing 130 have the choking effect for the radio frequency currents.

Namely, this choking effect for the radio frequency currents can be obtained by attaching a balun 138 of a length $\lambda/4$ at the point "p" as indicated in FIG. 45B, according to the idea of the conventional balun. When this balun 138 is attached, the outer side of the vertical portion 137c and the balun 138 effectively function as short-circuited parallel lines, on which the radio frequency currents I and the radio frequency voltage V flowing from the feeding point "p" are distributed as indicated in FIG. 45C. Consequently, the impedance Z of the short-circuited side of these parallel lines viewed from the free end side appear to be equal to an ideal value of $\infty$ as the current is zero and the voltage is maximum at the free end side, so that the radio frequency currents are effectively choked.

Now, in this configuration of FIG. 44, in order to avoid the problem associated with such a conventional balun, the similar choking effect is achieved by the horizontal portion 137b and the top surface of the device casing 130. Namely, as indicated in FIG. 46, viewing from the point "m", this horizontal portion 137b is short-circuited by the device casing 130 at a position λ/4 away from the point "m", so that, viewing from the point "m", the horizontal portion 137b and the top surface of the device casing 130 appear as short-circuited parallel lines, whose impedance is effectively ∞. Consequently, the choking effect for the radio frequency currents is effectively realized at the point "m", such that the radio frequency currents flowing from the feeding point "p" toward the device casing 130 are choked at the point "m" and do not reach to the device casing 130. As a result, the interaction with the user's body in a vicinity of the device casing 130 can be prevented while also reducing the interaction between the currents on the antenna 139 and the currents on the device casing 130. In this manner, the desired choking effect for the radio frequency currents can be achieved in this configuration of FIG. 44 in the structure which is much simpler than that of the conventional sleeve antenna, without using any additional structural element in a form of the balun.

Figure 1:
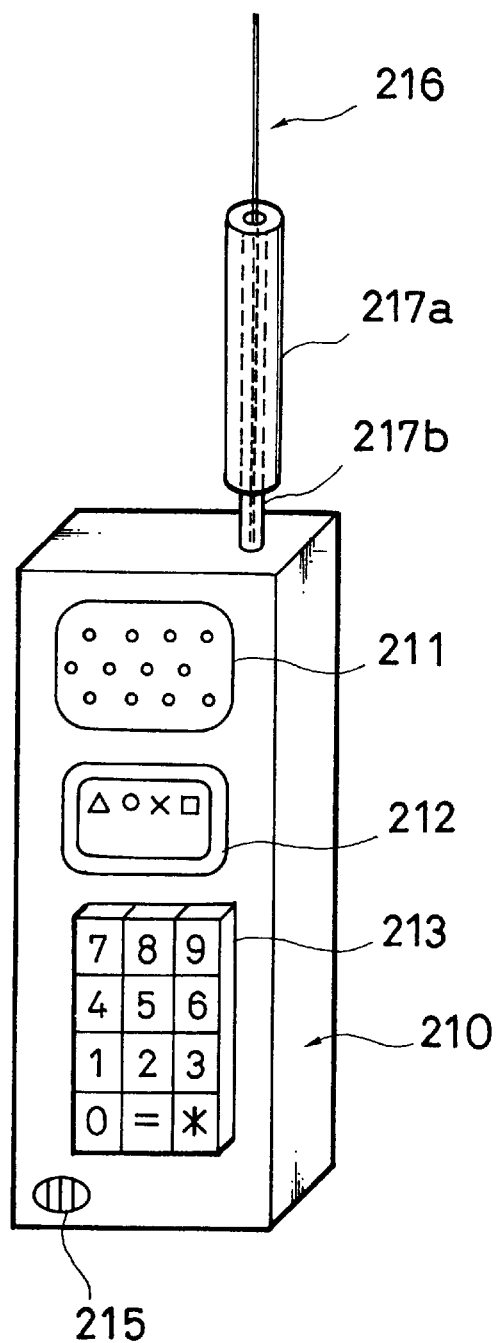
FIG. 1 is a perspective view of a conventional sleeve monopole antenna with a balun.
Figure 2:
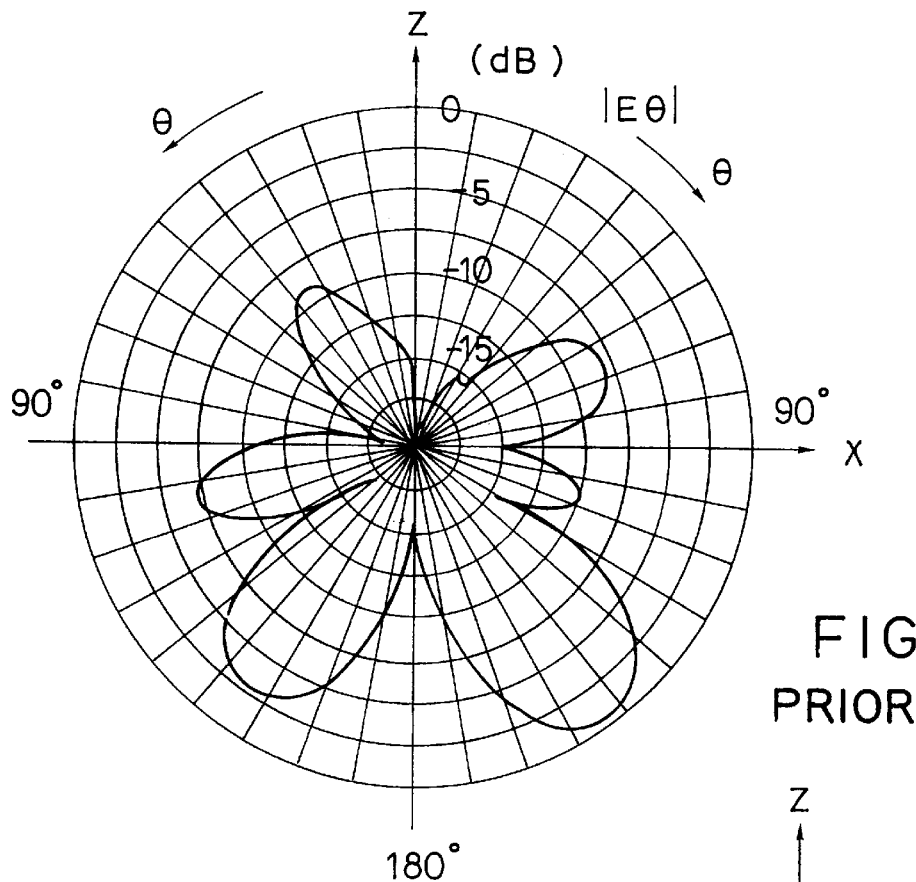
FIG. 2 is a graph of a radiation field realized by a conventional sleeve monopole antenna without a balun.
Figure 3:
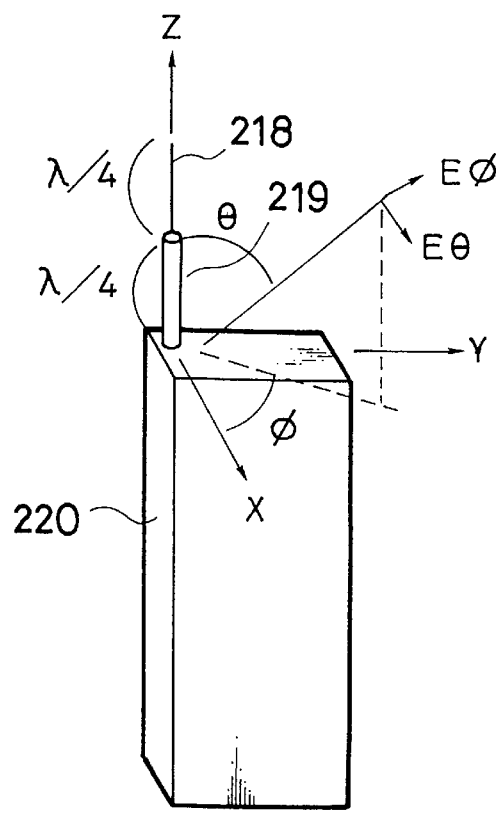
FIG. 3 is a perspective view of a conventional sleeve monopole antenna without a balun which has the radiation field shown in FIG. 2.
Figure 4:
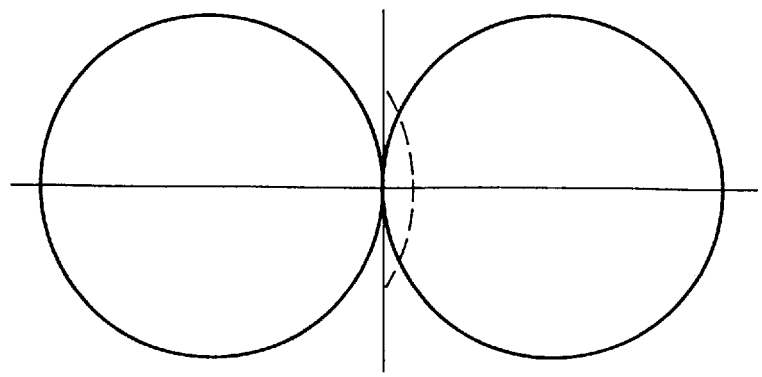
FIG. 4 is an illustration of a radiation field of an ideal $\lambda/2$ dipole antenna.
Figure 5:
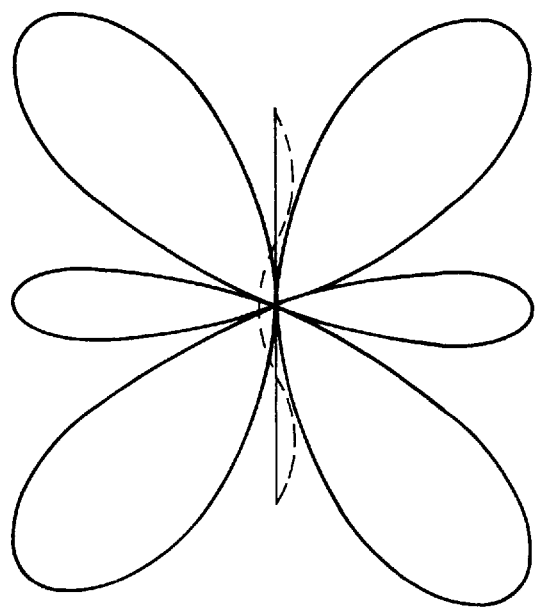
FIG. 5 is an illustration of a radiation field of an $(2/3)\lambda$ dipole antenna.
Figure 47A:
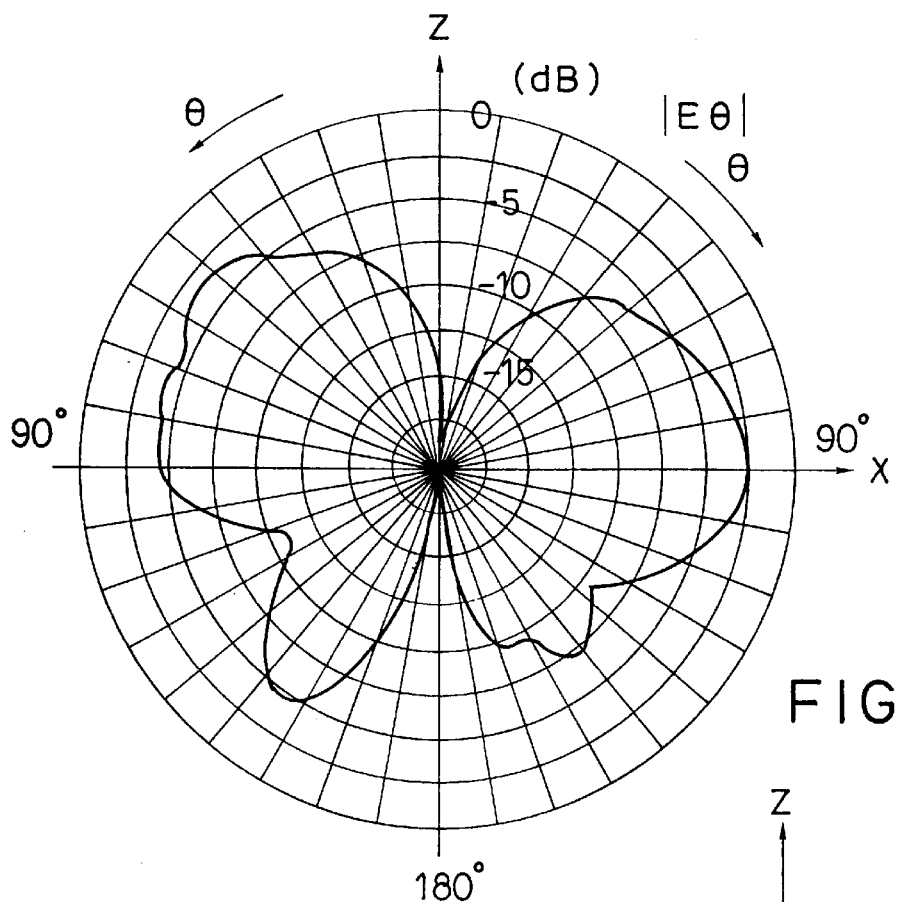
FIG. 47A is a graph of a radiation field realized by a version of the configuration of FIG. 44.
Figure 47B:
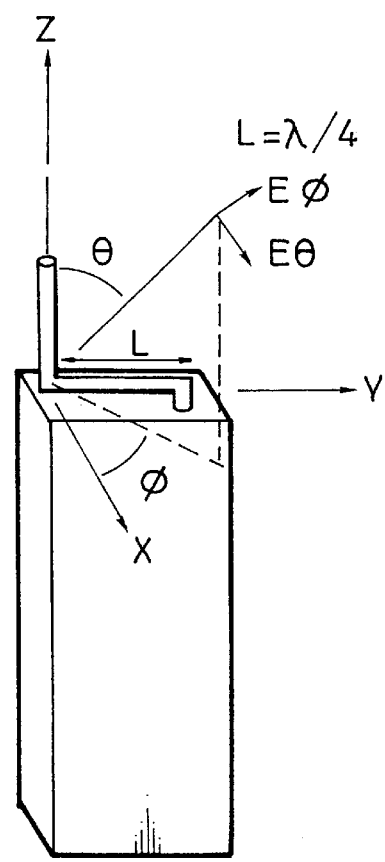
FIG. 47B is a perspective view of an antenna configuration which has the radiation field shown in FIG. 47A.
Figure 48A:
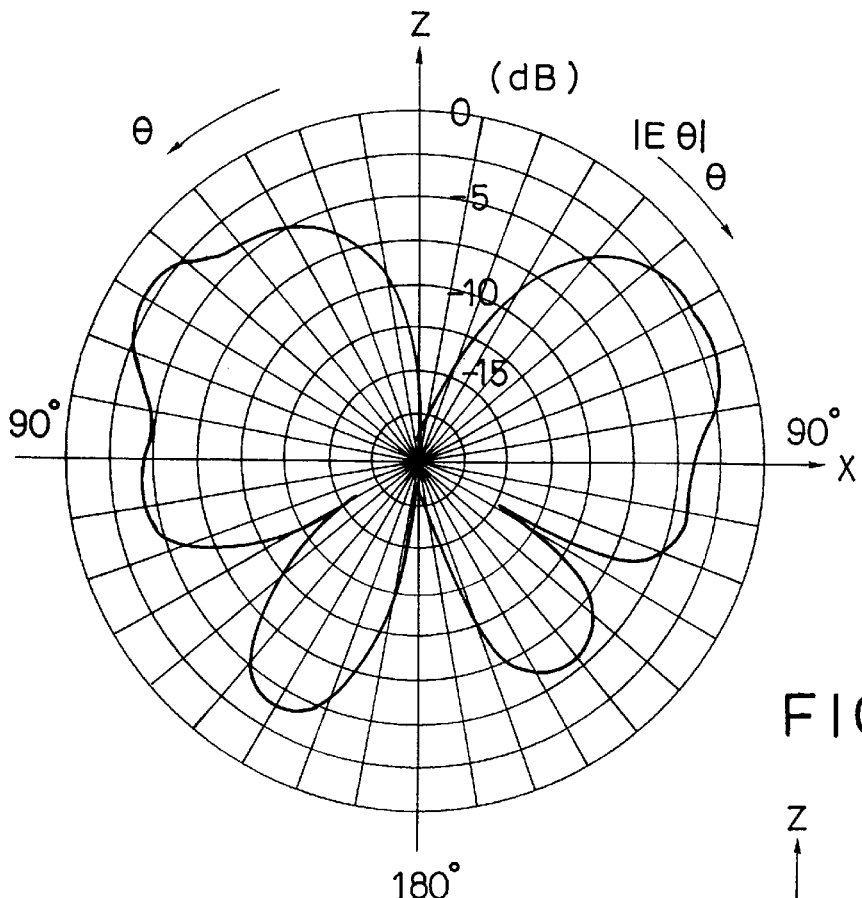
FIG. 48A is a graph of a radiation field realized by another version of the configuration of FIG. 44.
Figure 48B:
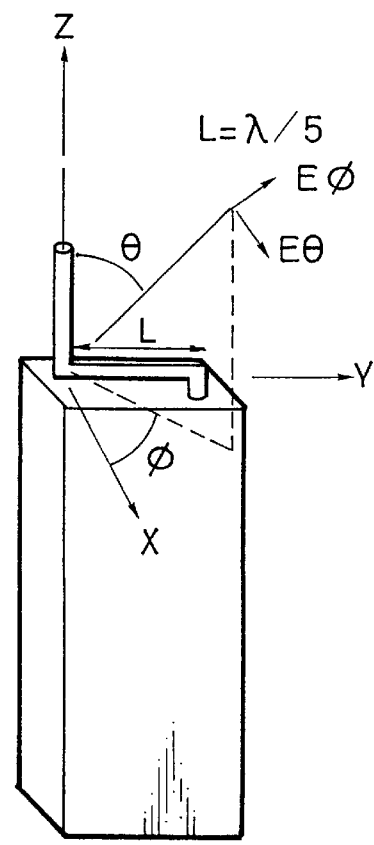
FIG. 48B is a perspective view of an antenna configuration which has the radiation field shown in FIG. 48A.

The radiation field realized by this configuration of FIG. 44 is plotted in FIG. 47A for the geometry of FIG. 47B, which is much closer to the radiation field of the ideal λ/2 dipole antenna shown in FIG. 4, than the radiation field shown in FIG. 2 of the conventional sleeve monopole antenna without balun, which indicates the significant reduction of the currents flowing into the device casing 130 in this configuration of FIG. 44. Also, the radiation field realized by the configuration similar to that of FIG. 44 in which the length of the horizontal portion 137b is set to be λ/5 rather than λ/4 is plotted in FIG. 48A for the geometry of FIG. 48B, which still shows a considerable improvement of the reduction of the currents flowing into the device casing 130 compared with the conventional sleeve monopole antenna without balun.

Next, a configuration shown in FIG. 49 realizes the choking effect achieved by the configuration of FIG. 44 in a different configuration in a form of a coaxial antenna. Namely, this configuration of FIG. 49 comprises a cylindrical sleeve 149 of a length λ/4 embedded near a corner of the top surface of the device casing 140 and connected with the device casing 140 at a point "m", a feeding line 147a provided in this cylindrical sleeve 149, where the feeding line 147a is short-circuited with the cylindrical sleeve 149 at the bottom "n" of the cylindrical sleeve 149 and extending upwards from the cylindrical sleeve 149 for a length of λ/4, and an antenna 147b attached to the feeding line 147a at a point "p". Here, the antenna 147b has a total length of λ/4 which is put in a coil shape in order to reduce the height of the antenna 147b.

In this configuration of FIG. 49, viewing from the point "m", the feeding line 147a is short-circuited by the cylindrical sleeve 149 at a position of "n" which is λ/4 away from the point "m", so that, viewing from the point "m", the feeding line 147a and the cylindrical sleeve 149 appear as short-circuited parallel lines, whose impedance is effectively ∞. Consequently, the choking effect for the radio frequency currents is effectively realized at the point "m", such that the radio frequency currents flowing from the feeding point "p" toward the device casing 140 are choked at the point "m" and do not reach to the device casing 140. As a result, the interaction with the user's body in a vicinity of the device casing 140 can be prevented while also reducing the interaction between the currents on the antenna 147b and the currents on the device casing 140. In this manner, the desired choking effect for the radio frequency currents can be achieved in this configuration of FIG. 49 in the structure which is much simpler than that of the conventional sleeve antenna, without using any additional structural element in a form of the balun.

Next, a configuration shown in FIG. 50 realizes the choking effect achieved by the configuration of FIG. 44 in a still different configuration. Namely, this configuration of FIG. 50 comprises a device casing 150 having a cut out portion of a length λ/4 at one corner, on which a feeding line 150a which is short-circuited with the device casing 150 at the bottom "n" of the cut out portion and extending upwards from a point "m" at the same level as the top surface of the device casing 150 for a length of λ/4 in a coil shape to reduce its height, and an antenna 150b, attached to the feeding line 150a at a point "p", of a length λ/4 in a coil shape to reduce its height.

In this configuration of FIG. 50, viewing from the point "m", the feeding line 150a is short-circuited by the device casing 150 at a position of "n" which is λ/4 away from the point "m", so that, viewing from the point "m", the feeding line 150a and the device casing 150 appear as short-circuited parallel lines, whose impedance is effectively ∞. Consequently, the choking effect for the radio frequency currents is effectively realized at the point "m", such that the radio frequency currents flowing from the feeding point "p" toward the device casing 150 are choked at the point "m" and do not reach to the device casing 150. As a result, the interaction with the user's body in a vicinity of the device casing 150 can be prevented while also reducing the interaction between the currents on the antenna 150b and the currents on the device casing 150. In this manner, the desired choking effect for the radio frequency currents can be achieved in this configuration of FIG. 50 in the structure which is much simpler than that of the conventional sleeve antenna, without using any additional structural element in a form of the balun.

It is to be noted that various manners of the improving the performance of the device and reducing the interaction of the antenna with the user's body described above can be combined in any suitable combination.

In addition, the various antenna configurations described above are not only applicable to the portable radio communication device, but also to other radio related devices using a combination of an antenna and a conductive casing body such as a card handling device sing a radio communication, a multi-media handling device such as a personal computer using a radio communication, a local area network terminal using a radio communication, a compact size radio communication station, and a mobile communication device such as an automobile radio communication device. Here, the casing body may not necessarily be made entirely from a conductive material, and it suffices for the casing body to have at least a portion which is conductive. Thus, in a case of the automobile radio communication device for example, the casing body can be housed inside the automobile chassis while the antenna is mounted on the automobile chassis.

Also, the various antenna configurations using the strip-like antenna element and a monopole antenna element described above may be modified to incorporate more than three antenna elements, and each antenna element may be put in any desired shape such as U-shape, J-shaped, O-shaped, T-shape, triangular shape, fan shape, loop shape, spiral shape, etc.

It is further to be noted that, besides those already mentioned above, many modifications and variations of the above embodiments may be made without departing from the novel and advantageous features of the present inven-

What is claimed is:

1. A radio communication device, comprising:

a device body made of a conductor member for providing a ground, containing at least one of a radio transmitter and a radio receiver; and an antenna, mounted on the device body, formed by first and second conductor elements for transmitting/receiving radio waves and which are connected together at a common feeding point connected with said at least one of the radio transmitter and the radio receiver and which are disposed in a coplanar relationship around the common feeding point, the first and second conductor elements having respective free ends and an identical electrical length with respect to the device body between the common feeding point and the respective free ends, thereby mitigating dual resonance effects on the antenna, wherein the first and second conductor elements are made to have an identical electrical length with respect to the device body by forming the first and second conductor elements symmetrically with respect to the common feeding point, and by a free end of the first conductor element being set at a different distance from the surface of the device body than a free end of the second conductor element to the surface of the device body, and wherein the distance from said first conductor element to the surface of the device body is set to be different from the distance from said second conductor element to the surface of the device body by providing a conductive convex portion on the surface of the device body located in a vicinity of the free end of one of the first and second conductor elements.

2. A radio communication device, comprising:

a device body made of a conductor member for providing a ground, containing at least one of a radio transmitter and a radio receiver; and an antenna, mounted on the device body, formed by first and second conductor elements for transmitting/receiving radio waves and which are connected together at a common feeding point connected with said at least one of the radio transmitter and the radio receiver and which are disposed in a coplanar relationship around the common feeding point, the first and second conductor elements having respective free ends and an identical electrical length with respect to the device body between the common feeding point and the respective free ends, thereby mitigating dual resonance effects on the antenna, wherein the first and second conductor elements are made to have an identical electrical length with respect to the device body by forming the first and second conductor elements symmetrically with respect to the common feeding point, and by a free end of the first conductor element being set at a different distance from the surface of the device body than a free end of the second conductor element to the surface of the device body, and wherein the distance from said first conductor element to the surface of the device body is set to be different from the distance from said second conductor element to the surface of the device body by bending the free end of one of the first and second conductor elements toward the surface of the device body.

* * * * *